United States Patent
Zhang et al.

(10) Patent No.: US 12,022,497 B2
(45) Date of Patent: Jun. 25, 2024

(54) CONFIGURATION INFORMATION TRANSMISSION METHOD AND DEVICE

(71) Applicant: ZTE CORPORATION, Guangdong (CN)

(72) Inventors: Shujuan Zhang, Guangdong (CN); Zhaohua Lu, Guangdong (CN); Yu Ngok Li, Guangdong (CN); Nan Zhang, Guangdong (CN); Bo Gao, Guangdong (CN); Feiming Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 283 days.

(21) Appl. No.: 17/048,315

(22) PCT Filed: Apr. 16, 2019

(86) PCT No.: PCT/CN2019/082912
§ 371 (c)(1),
(2) Date: Oct. 16, 2020

(87) PCT Pub. No.: WO2019/201247
PCT Pub. Date: Oct. 24, 2019

(65) Prior Publication Data
US 2021/0160880 A1    May 27, 2021

(30) Foreign Application Priority Data
Apr. 16, 2018 (CN) .......................... 201810340182.5

(51) Int. Cl.
*H04W 72/04* (2023.01)
*H04L 5/00* (2006.01)
(Continued)

(52) U.S. Cl.
CPC .......... *H04W 72/53* (2023.01); *H04L 5/0064* (2013.01); *H04W 24/10* (2013.01);
(Continued)

(58) Field of Classification Search
CPC ............. H04W 72/0493; H04W 24/10; H04W 56/0045; H04W 72/042; H04W 72/0446; H04W 72/0453; H04L 5/0064
See application file for complete search history.

(56) References Cited

U.S. PATENT DOCUMENTS 10,517,078 B2 * 12/2019 Kim ...................... H04W 76/27
11,044,701 B2    6/2021 Tang
(Continued)

FOREIGN PATENT DOCUMENTS

| CN | 103686772 A | 3/2014 |
| CN | 105515721 A | 4/2016 |

(Continued)

OTHER PUBLICATIONS

Supplementary Partial European Search Report for EP19788637, dated Feb. 3, 2022.
(Continued)

*Primary Examiner* — Bailor C Hsu
(74) *Attorney, Agent, or Firm* — KDW Firm PLLC

(57) ABSTRACT

Provided are configuration information transmission method and device. The method includes: transmitting configuration information, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M, and C are integers greater than or equal
(Continued)

Determine configuration information, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M and C are integers greater than or equal to 1 — S102

Transmit the configuration information — S104 to 1. The above solution resolves the issue of the lack of data transmission between multiple TRPs and a terminal in the related art. Multiple sets of configuration information are configured for one frequency domain bandwidth, such that different configuration information can be used in multi-TRP transmission, thereby realizing data transmission between multiple TRPs and a terminal.

15 Claims, 4 Drawing Sheets

(51) Int. Cl.
*H04W 24/10* (2009.01)
*H04W 56/00* (2009.01)
*H04W 72/0446* (2023.01)
*H04W 72/0453* (2023.01)
*H04W 72/23* (2023.01)
*H04W 72/53* (2023.01)

(52) U.S. Cl.
CPC ... *H04W 56/0045* (2013.01); *H04W 72/0446* (2013.01); *H04W 72/0453* (2013.01); *H04W 72/23* (2023.01)

(56) References Cited

U.S. PATENT DOCUMENTS

| | | | | |
|---|---|---|---|---|
| 2015/0319718 | A1* | 11/2015 | Yang | H04W 52/40 370/252 |
| 2016/0150510 | A1 | 5/2016 | Shao et al. | |
| 2018/0027585 | A1 | 1/2018 | Guo et al. | |
| 2018/0034612 | A1 | 2/2018 | Lin et al. | |
| 2018/0063865 | A1* | 3/2018 | Islam | H04L 5/0064 |
| 2018/0124815 | A1* | 5/2018 | Papasakellariou | H04W 72/0446 |
| 2018/0192416 | A1* | 7/2018 | Yin | H04L 1/1607 |
| 2019/0036665 | A1* | 1/2019 | Park | H04L 5/0091 |
| 2019/0141693 | A1* | 5/2019 | Guo | H04W 72/042 |
| 2019/0141734 | A1* | 5/2019 | Lei | H04L 5/0098 |
| 2019/0289586 | A1* | 9/2019 | Ouchi | H04L 5/0055 |
| 2020/0037247 | A1* | 1/2020 | Liao | H04W 52/0216 |
| 2020/0322109 | A1* | 10/2020 | Yu | H04B 7/0617 |
| 2020/0350972 | A1* | 11/2020 | Yi | H04L 1/12 |
| 2020/0351892 | A1* | 11/2020 | Yi | H04L 5/0092 |
| 2021/0022167 | A1* | 1/2021 | Khoshnevisan | H04W 72/23 |
| 2021/0058805 | A1* | 2/2021 | Ji | H04W 72/56 |
| 2021/0144744 | A1* | 5/2021 | Zhou | H04W 72/23 |
| 2021/0321442 | A1* | 10/2021 | Jung | H04L 5/005 |

FOREIGN PATENT DOCUMENTS

| | | |
|---|---|---|
| CN | 107547179 A | 1/2018 |
| CN | 107666340 A | 2/2018 |
| CN | 107911203 A | 4/2018 |
| CN | 108702757 A | 10/2018 |
| EP | 2890194 A1 | 7/2015 |
| WO | 2014171869 A1 | 10/2014 |

OTHER PUBLICATIONS

Huawei et al., "Discussion on transmission parameter sets", 3GPP Draft; R1-1706924, 3rd Generation Partnership Project (3GPP), Mobile Competence Centre; 650, Route Des Lucioles; F-06921 Sophia-Antipolis Cedex, France, vol. RAN WG1, No. Hangzhou, China; May 15, 2017-May 19, 2017. May 14, 2017 (May 14, 2017), XP051272154, Retrieved from the Internet: URL:http://www.3gpp.org/ftp/Meetings_3GPP_SYNC/RAN1/Docs/ [retrieved on May 14, 2017].
International Search Report and Written Opinion for Application No. PCT/CN2019/082912, dated Jun. 21, 2019, 2 pages.
Session Chair Samsung. "Session Notes for Agenda Item 7.1.2" 3GPP TSG RAN WG1 Meeting #92, R1-1803462, Athens, Greece, Mar. 2, 2018.
Ericsson. "E127-Cleaning up Common vs. Dedicated" 3GPP TSG-RAN WG2 NR AH#3, R2-1801541, Vancouver, Canada, Jan. 26, 2018.
Office Action for Chinese Application No. 201810340182.5, dated Aug. 27, 2021, original and translated documents, 17 pages.
Search Report for Chinese Application No. 201810340182.5, dated Aug. 27, 2021, original and translated documents, 5 pages.

* cited by examiner

CONFIGURATION INFORMATION TRANSMISSION METHOD AND DEVICE

CROSS-REFERENCE TO RELATED APPLICATIONS

This application is a U.S. National Stage Application, filed under 35 U.S.C. 371, of International Patent Application No. PCT/CN2019/082912, filed on Apr. 16, 2019, which claims a priority to a Chinese patent application No. 201810340182.5 filed on Apr. 16, 2018, disclosures of which are incorporated herein by reference in their entireties.

TECHNICAL FIELD

The present disclosure relates to the field of communications and, specifically, to a configuration information transmission method and a configuration information transmission device.

BACKGROUND

In the related art, in single transmission reception point (TRP) transmission or single panel transmission, only one set of high-layer configuration signaling of a data channel or a control channel is needed. In multi-TRP transmission or multi-panel transmission, considering that transmission parameters of respective TRPs or respective panels are different, a flexible signaling configuration manner is required. Since transmissions of multiple TRPs or multiple panels are independent from each other, how to avoid collisions between the resources scheduled by the multiple TRPs or multiple panels and how to reduce interference between the multiple TRPs or multiple panels are the central issues considered herein.

No efficient solution has been provided to resolve the issue of the lack of implementing data transmission between multiple TRPs and a terminal in the related art.

SUMMARY

Embodiments of the present disclosure provide a configuration information transmission method and a configuration information transmission device to at least resolve the issue of the lack of data transmission between multiple TRPs and a terminal in the related art.

According to an embodiment of the present disclosure, a configuration information method is provided. The method includes: transmitting configuration information, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M and C are integers greater than or equal to 1.

According to another embodiment of the present disclosure, a correspondence determination method is further provided. The method includes: determining a correspondence between P control channel resources and Q sets of configuration information of one transmission parameter set, where P is a positive integer greater than or equal to 1, and Q is a positive integer less than or equal to P.

According to another embodiment of the present disclosure, a timing advance (TA) information determination method is further provided. The method includes: determining, by a first communication node, TA information according to at least one of following information: a first channel, a first signal, a second channel, or a second signal, where the first channel or the first signal is a channel or signal transmitted by the first communication node, and the second channel or the second signal is a channel or signal received by the first communication node; and transmitting a third channel or a third signal according to the TA information.

According to another embodiment of the present disclosure, a TA information determination method is further provided. The method includes: transmitting, by a second communication node, signaling information to a first communication node, where the signaling information includes at least one of following association relationships: an association relationship between a first channel or a first signal and TA information, an association relationship between a second channel or a second signal and the TA information, or an association relationship between a combination of the first channel or the first signal and the second channel or the second signal and the TA information, where the first channel or the first signal is a signal transmitted by the first communication node, and the second channel or the second signal is a signal received by the first communication node.

According to another embodiment of the present disclosure, a configuration information transmission device is further provided. The device includes a first transmitting module, which is configured to transmit configuration information, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M and C are integers greater than or equal to 1.

According to another embodiment of the present disclosure, a correspondence determination device is provided. The device includes a first determining module, which is configured to determine a correspondence between P control channel resources and Q sets of configuration information of one transmission parameter set, where P is a positive integer greater than or equal to 1, and Q is a positive integer less than or equal to P.

According to another embodiment of the present disclosure, a TA information determination device is further provided. The device includes: a second determining module, which is configured to determine TA information according to at least one of following information: a first channel, a first signal, a second channel, or a second signal, where the first channel or the first signal is a channel or a signal transmitted by a first communication node, and the second channel or the second signal is a channel or a signal received by the first communication node; and a second transmitting module, which is configured to transmit a third channel or a third signal according to the TA information.

According to another embodiment of the present disclosure, a TA information determination device is further provided. The device includes a second transmitting module, which is configured to transmit signaling information to a first communication node, where the signaling information includes at least one of following association relationships: an association relationship between a first channel or a first signal and TA information, an association relationship between a second channel or a second signal and the TA information, or an association relationship between a combination of the first channel or the first signal and the second channel or the second signal and the TA information; where the first channel or the first signal is a signal transmitted by the first communication node, and the second channel or the second signal is a signal received by the first communication node.

According to another embodiment of the present disclosure, a storage medium is further provided. The storage medium stores a computer program. When the computer program is executed, the steps in any one of the preceding method embodiments are performed.

According to another embodiment of the present disclosure, an electronic device is provided. The electronic device includes a memory and a processor. The memory stores a computer program. The processor is configured to execute the computer program to perform the steps in any one of the preceding method embodiments.

Through the present disclosure, configuration information is transmitted, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M, and C are integers greater than or equal to 1. The above solution resolves the issue of the lack of data transmission between multiple TRPs and a terminal in the related art. Multiple sets of configuration information are configured for a frequency domain bandwidth, such that different configuration information can be used in multi-TRP transmission, thereby realizing data transmission between multiple TRPs and a terminal.

DETAILED DESCRIPTION

The present disclosure will be hereinafter described in detail with reference to drawings in conjunction with embodiments. It is to be noted that if not in collision, the embodiments described herein and the features in the embodiments may be combined with each other.

It is to be noted that the terms "first", "second" and the like in the description, claims and drawings of the present disclosure are used to distinguish between similar objects and are not necessarily used to describe a particular order or sequence.

It is to be added that the present application, a first communication node may be a terminal, and a second communication node may be a base station, which, however, is not limited herein.

An embodiment of the present application provides a mobile communication network (which includes, but is not limited to a 5G mobile communication network). The network architecture of the network may include a network side device (such as a base station) and a terminal. An information transmission method executable on the above network architecture is provided in the embodiment. It is to be noted that an execution environment of the above information transmission method provided by the embodiment of the present application is not limited to the above network architecture.

Embodiment One

Figure 1:
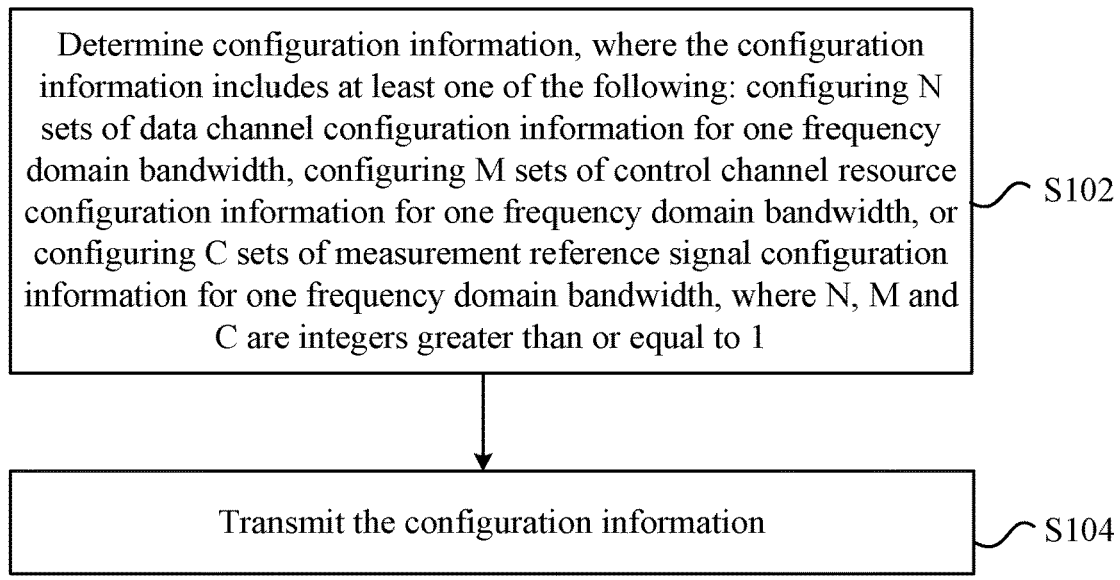
FIG. 1 is a flowchart of a configuration information transmission method according to an embodiment of the present disclosure.

In an embodiment, a configuration information transmission method executed on the network architecture described above is provided. FIG. 1 is a flowchart of a configuration information transmission method according to an embodiment of the present disclosure. As shown in FIG. 1, the method includes steps described below.

In step S102, configuration information is determined, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M and C are integers greater than or equal to 1.

In step S104, the configuration information is transmitted.

It is to be added that one set of control channel resource configuration information may be one of the following configuration information: one set of physical downlink control channel (PDCCH) configuration information, one set of control resource set (CORESET) configuration information, one set of search space configuration information, one set of search space configuration information corresponding to one aggregation level, or one set of physical uplink control channel (PUCCH) configuration information.

Through the above steps, configuration information is transmitted, where the configuration information includes at least one of the following: configuring N sets of data channel configuration information for one frequency domain bandwidth, configuring M sets of control channel resource configuration information for one frequency domain bandwidth, or configuring C sets of measurement reference signal configuration information for one frequency domain bandwidth, where N, M, and C are integers greater than or equal to 1. The above solution resolves the issue of the lack of implementing data transmission between multiple TRPs and a terminal in the related art. Multiple sets of configuration information are configured for one frequency domain bandwidth, such that different configuration information can be used in multi-TRP transmission, thereby realizing data transmission between multiple TRPs and the terminal.

Optionally, the above steps may, but may not necessarily, be executed by a base station or a terminal.

Optionally, step S102 and step S104 may be executed in a reverse order, that is, step S104 may be executed before step S102.

Optionally, the one frequency domain bandwidth is one bandwidth part (BWP), and/or the one frequency domain bandwidth is one dedicated frequency domain bandwidth.

Optionally, the method includes at least one of the following.

A correspondence between N1 sets of data channel configuration information included in a first frequency domain bandwidth and M1 sets of control channel resource configuration information included in a second frequency domain bandwidth is established through signaling information and/or an agreed manner.

A correspondence between N2 sets of control channel configuration information of a third frequency domain bandwidth and M2 sets of control channel resource configuration information of a fourth frequency domain bandwidth is established through signaling information and/or an agreed manner.

A correspondence between C1 sets of reference signal configuration information included in a fifth frequency domain bandwidth and M3 sets of control channel resource configuration information included in a sixth frequency domain bandwidth is established through signaling information and/or an agreed manner.

A correspondence between N4 sets of control channel configuration information of a seventh frequency domain bandwidth and D2 sets of control channel resource configuration information included in one set of control channel configuration information of an eighth frequency domain bandwidth is established through signaling information and/or an agreed manner.

One set of data channel configuration information includes at least one of following information corresponding to a set of data channels: process number set information, or TA information.

One set of data channel configuration information includes multiple sets of configuration information of one transmission parameter set of a set of data channels, where the transmission parameter set includes at least one of following parameters: process number set information, BWP set information, demodulation reference signal port set information, demodulation reference signal information, quasi co-located reference signal set information, transmission configuration indication (TCI) state pool indication information, precoding resource granularity PRB bundling size indication information, rate mating indication information, carrier indicator indication information, a generation parameter of a scrambling sequence, TA information, control channel port information, a time domain resource allocation parameter, or a frequency domain resource allocation parameter. It is to be added that multiple sets of configuration information of the one transmission parameter set can be configured in high-layer signaling of a channel, and which set of configuration information corresponding to one transmission parameter set used by a scheduled channel is further indicated in physical layer control signaling. The scrambling sequence generation parameter in the embodiment may be nip or cell-radio network temporary identity (C-RNTI) in subsequent formula (2).

In the above, N1, N2, N3, N4, M1, M2, D1, D2, M3 and C1 are positive integers greater than or equal to 1.

It is to be added is that the above correspondence may be: the control channel configuration information is used for scheduling which data channel; or a downlink control channel is used for controlling which uplink control channel; or which set of data channel configuration information corresponds to which set of control channel configuration information. For example, when downlink BWP1 includes configuration information of M1 sets of PDCCHs and downlink BWP2 includes configuration information of N1 sets of PDSCHs, which set of PDSCHs in the N1 sets of PDSCHs included in BWP2 is a PDSCH in BWP2 scheduled in a PDCCH of BWP1 needs to be indicated.

Optionally, the frequency domain bandwidths in the above embodiment may include at least one of the following:

both the first frequency domain bandwidth and the second frequency domain bandwidth are downlink frequency domain bandwidths;

the first frequency domain bandwidth is an uplink frequency domain bandwidth, and the second frequency domain bandwidth is a downlink frequency domain bandwidth;

the third frequency domain bandwidth is an uplink frequency domain bandwidth, and the fourth frequency domain bandwidth is a downlink frequency domain bandwidth;

both the fifth frequency domain bandwidth and the sixth frequency domain bandwidth are downlink frequency domain bandwidths; or the fifth frequency domain bandwidth is an uplink frequency domain bandwidth, and the sixth frequency domain bandwidth is a downlink frequency domain bandwidth.

Optionally, the method includes at least one of the following.

first control signaling in the second frequency domain bandwidth schedules a first data channel in the first frequency domain bandwidth, where a transmission parameter of the first control signaling is obtained according to one set of control channel resource configuration information in the M1 sets of control channel resource configuration information included in the second frequency domain bandwidth, and a transmission parameter of the first data channel is obtained according to one set of data channel configuration information in the second frequency domain bandwidth which has a correspondence with the one set of control channel resource configuration information;

second control signaling in the fourth frequency bandwidth schedules a third control channel in the third frequency bandwidth, where a transmission parameter of the second control signaling is obtained according to one set of control channel resource configuration information in the M2 sets of control channel resource configuration information included in the fourth frequency domain bandwidth, and a transmission parameter of the third control channel is obtained according to one set of control channel configuration information in the third frequency bandwidth which has a correspondence with the one set of control channel resource configuration information;

third control signaling in the sixth frequency domain bandwidth schedules a second data channel in the fifth frequency domain bandwidth, where a transmission parameter of the third control signaling is obtained according to one set of control channel resource configuration information in one piece of control channel configuration information in the sixth frequency domain bandwidth (which may be one set of control channel resource configuration information in the D1 sets of control channel resource configuration information included in the sixth frequency domain bandwidth described above), and a transmission parameter of the second data channel is obtained according to one set of data channel configuration information in the fifth frequency domain bandwidth which has a correspondence with the one set of control channel resource configuration information;

fourth control signaling in the eighth frequency domain bandwidth schedules a fourth control channel in the seventh frequency domain bandwidth, where a transmission parameter of the fourth control signaling is obtained according to one set of control channel resource configuration information in one piece of control channel configuration information in the eighth frequency domain bandwidth (which may be one set of control channel resource configuration information in the D2 sets of control channel resource configuration information included in the eighth frequency domain bandwidth described above), and a transmission parameter of the fourth data channel is obtained according to one set of control channel configuration information in the seventh frequency domain bandwidth which has a correspondence with the one set of control channel resource configuration information.

Optionally, the method includes at least one of steps described below:

first control signaling is transmitted, where the first control signaling is used for configuring or scheduling a data channel in one frequency domain bandwidth, and the first control signaling includes configuration information index information of N5 sets of data channel configuration information included in the one frequency domain bandwidth, where a transmission parameter of the data channel is obtained according to data channel configuration information corresponding to the index information;

second control signaling is transmitted, where the second control signaling is used for configuring or scheduling a control channel in one frequency domain bandwidth, and the second control signaling includes configuration information index information of N6 sets of control channel configuration information included in the one frequency domain bandwidth, where a transmission parameter of the control channel is obtained according to control channel resource configuration information corresponding to the index information; or third control signaling is transmitted, where the third control signaling is used for configuring or scheduling a measurement reference signal resource in one frequency domain bandwidth, and the third control signaling includes configuration information index information of C2 sets of measurement reference signal configuration information included in the one frequency domain bandwidth, where a transmission parameter of the measurement reference signal resource is obtained according to measurement reference signal configuration information corresponding to the index information.

In the above, N5, N6 and C2 are positive integers greater than or equal to 1.

Optionally, the first control signaling is physical layer control signaling, the second control signaling is physical layer control signaling, and the third control signaling is physical layer control signaling.

According to another embodiment of the present disclosure, a correspondence determination manner is further provided. The manner includes steps described below.

In step one, a correspondence between P control channel resources and Q sets of configuration information of one transmission parameter set is determined, where P is a positive integer greater than or equal to 1, and Q is a positive integer less than or equal to P.

The above solution resolves the issue of the lack of relation between multiple control channel resources and multiple sets of transmission parameter configuration information in the related art. A correspondence between multiple control channel resources and multiple sets of transmission parameter configuration information is established, such that subsequent data transmission can be performed based on this correspondence.

It is to be added that both the terminal side and the base station side can execute the solution in step one described above. The one transmission parameter set may be: the parameter set includes multiple parameters, and different sets of configuration information corresponding to multiple sets of control channel resources have different values of the multiple parameters.

Optionally, the correspondence between P control channel resources and Q sets of configuration information of the one transmission parameter set is determined, and the method further includes at least one of the following: first control signaling schedules a channel or a signal, where a transmission parameter of the first control signaling is determined according to a parameter of one control channel resource in the P control channel resources, and a transmission parameter set of the channel or the signal is determined according to one set of configuration information in the Q sets of configuration information which has a correspondence with the one control channel resource; or the one transmission parameter set is a transmission parameter set corresponding to a channel or a signal, where control signaling for scheduling the channel or the signal is included in a control channel included in P2 control channel resources, or is included in a channel scheduled by a control channel included in the P2 control channel resources, where the P2 control channel resources belong to the P control channel resources.

Optionally, at least one of the P control channel resources or the Q sets of configuration information of the one transmission parameter set satisfy at least one of the following characteristics:

the P control channel resources belong to the same frequency domain bandwidth;

Q channels or Q signals corresponding to the Q sets of configuration information of the one transmission parameter set belong to the same frequency domain bandwidth;

the P control channel resources are control channel resources that one first communication node needs to detect (it is to be added that the P control channel resources are for one terminal).

the P control channel resources and Q channels or Q signals corresponding to the Q sets of configuration information belong to the same frequency domain bandwidth;

a first communication node is capable of simultaneously receiving Q types of channels and/or signals corresponding to the Q sets of configuration information, where the first communication node is a node that receives control channel resources;

a first communication node is capable of receiving the P control channel resources simultaneously, where the first communication node is a node that receives control channel resources;

a first communication node is not capable of simultaneously receiving different control channel resources in P1 control channel resources, where the P1 control channel resources belong to the P control channel resources and correspond to the same set of configuration information of the one transmission parameter set, and the first communication node is a node that receives control channel resources; or a first communication node is not capable of simultaneously receiving multiple control channel resources corresponding to the same set of configuration information of the one transmission parameter set, where the first communication node is a node that receives control channel resources.

In the above characteristics, the one transmission parameter set is about transmission parameters of the channels or signals.

Optionally, the step that a correspondence between P control channel resources and Q sets of configuration information of one transmission parameter set is determined includes at least one of the following:

in configuration information of one control channel resource, Q1 sets of configuration information of the one transmission parameter set corresponding to the one control channel resource are configured;

P1 control channel resources corresponding to one set of configuration information of the one transmission parameter set are included in the one set of configuration information of the one transmission parameter set;

a correspondence between one control channel resource and Q1 sets of configuration information of one transmission parameter set corresponding to a channel or a signal is determined, where a control signaling for scheduling the channel or the signal is included in a control channel included in the control channel resource, or is included in a channel scheduled by a control channel included in the control channel resource;

a correspondence between one control channel resource group and Q2 sets of configuration information of one transmission parameter set corresponding to a channel or a signal is determined, where a control signaling for scheduling the channel or the signal is included in a control channel included in the control channel resource group, or is included in a channel scheduled by a control channel included in the control channel resource group;

the one transmission parameter set is a transmission parameter set corresponding to a channel or a signal, where control signaling for scheduling the channel or the signal is included in a control channel included in one control channel resource, or is included in a channel scheduled by a control channel included in one control channel resource;

the one transmission parameter set is a transmission parameter set corresponding to a channel or a signal, where a control signaling for scheduling the channel or the signal is included in a control channel included in a control channel resource group, or is included in a channel scheduled by a control channel included in the control channel resource group;

Q3 sets of configuration information of one transmission parameter set corresponding to a channel and/or signal in each frequency domain bandwidth of X frequency domain bandwidths are determined, and a correspondence between one control channel resource and the Q3 sets of configuration information is determined, where X is a positive integer greater than or equal to 1, and control information included in the control channel resource is used for scheduling channels or signals in the X frequency domain bandwidths.

In the above, Q1 and Q2 are integers less than or equal to Q, P1 is an integer less than or equal to P, and the one frequency domain bandwidth is one component carrier (CC) or one bandwidth part (BWP).

Optionally, the correspondence between P control channel resources and Q sets of configuration information of one transmission parameter set is indicated through one of the following manners:

the configuration information index information of the Q sets of configuration information being included in the configuration information of the control channel resource (that is, the configuration information index information of the Q sets of configuration information being included in the control channel resource configuration information); or control channel resource index information of the P control channel resources being included in Q sets of configuration information of the one transmission parameter set.

Optionally, the correspondence between P control channel resources and Q sets of configuration information of the one transmission parameter set is determined, and the method includes at least one of the following:

the number of bits of a first control signaling is determined according to one set of configuration information in the Q set of configuration information:

the number of bits of a predetermined bit field of a first control signaling is determined according to one set of configuration information in the Q sets of configuration information; or the number of bits of a bit field of a first control signaling for notifying a transmission parameter of the one transmission parameter set is determined according to one set of configuration information in the Q sets of configuration information.

In the above, a transmission parameter of a control channel in which the first control signaling is located is obtained according to a transmission parameter of one control channel resource in the P control channel resources, and the one set of configuration information corresponds to the one control channel resource.

(It is to be noted that a first control channel resource in the optional embodiment may be any one set or one specified set of control channel resources in the P control channel resources, but is not intended to limit the sequence of the P control channel resources, and N-th information and an N-th resource in the present application are also not intended to limit the sequence).

Optionally, the one transmission parameter set include at least one of the following parameter information: process number set information, BWP set information, uplink control channel resource set information, demodulation reference signal port set information, demodulation reference signal information, quasi co-located reference signal set information, TCI state pool indication information, downlink data channel indication information, uplink data channel indication information, uplink control channel indication information, PRB bundling size indication information, rate mating indication information, carrier indicator indication information, measurement reference signal information, a generation parameter of a scrambling sequence, TA information, control channel port information, a time domain resource allocation parameter, a frequency domain resource allocation parameter, or aperiodic measurement reference signal information; where one TCI state includes configuration information of one or more quasi co-located (QCL) reference signal sets.

Optionally, the control channel resources are physical layer control channel resources; and/or configuration information of the one transmission parameter set is included in a high-layer signaling.

Optionally, the correspondence between P control channel resources and Q sets of configuration information of one transmission parameter set is determined, and the method includes the step described below:
 a second transmission parameter of a channel or a signal is obtained according to one set of configuration information of the one transmission parameter set, where the channel or the signal has a correspondence with one control channel resource in the P control channel resources, the one set of configuration information has a correspondence with the one control channel resource, and the second transmission parameter belongs to or does not belong to the one transmission parameter set.

Optionally, the step that the correspondence between P control channel resources and Q sets of configuration information of one transmission parameter set is determined includes that one control channel resource corresponds to Q1 sets of configuration information of the one transmission parameter set, where Q1 is an integer greater than or equal to 1.

Optionally, when Q1 is greater than 1, the following information is indicated through a control signaling transmitted in the one control channel resource: determining a transmission parameter of a channel or a signal scheduled by the control signaling according to one specified set of configuration information in the Q1 sets of configuration information. (It is to be noted that the first set of configuration information in the optional embodiment may be any one set or one specified set of configuration information in Q sets of configuration information, but is not intended to limit the sequence of Q sets of configuration information.)

Optionally, the P control channel resources include one of the following characteristics:
 one control channel resource is one PDCCH control channel resource;
 one control channel resource is one CORESET resource;
 one control channel resource is one search space set resource;
 one control channel resource is one search space resource of an aggregation level;
 one control channel resource is one candidate PDCCH resource; or
 a generation parameter of a scrambling sequence of one control channel.

According to another embodiment of the present disclosure, a TA information determination method is further provided. The method includes steps described below.

In step one, a first communication node determines TA information according to at least one of following information: a first channel, a first signal, a second channel, or a second signal; where the first channel or the first signal is a channel or a signal transmitted by the first communication node, and the second channel or the second signal is a channel or a signal received by the first communication node.

In step two, a third channel or a third signal is transmitted according to the TA information.

It is to be noted that the first signal may be a beam signal transmitted by a terminal.

The above solution resolves the issue of the lack of a solution for determining a TA value in the related art, thereby realizing the accurate determination of the TA value for transmitting a third signal based on a first signal and/or second signal.

Optionally, the second channel or the second signal being a channel or signal received by the first communication node further satisfies at least one of following characteristics:
 the second channel is a control channel, and the control channel includes a control signaling scheduling the third channel or the third signal;
 the second signal and a demodulation reference signal of a control signaling scheduling the third channel or the third signal satisfy a QCL relationship at least with respect to one QCL parameter; or
 a spatial filtering parameter of the third channel or the third signal is obtained according to a spatial filtering parameter of the second signal.

Optionally, the second signal and the demodulation reference signal of the control signaling scheduling the third channel or the third signal satisfying the QCL relationship at least with respect to one QCL parameter includes: the second signal and the demodulation reference signal of the control signaling scheduling the third channel or the third signal satisfying the QCL relationship with respect to delay spread and/or average delay.

It is to be added that the second signal and the demodulation reference signal satisfy the QCL relationship at least with respect to a multi-path TA and/or an average TA.

Optionally, the control signaling scheduling the first channel and the control signaling scheduling the third channel or the third signal belong to the same control channel resource.

Optionally, the first communication node obtains at least one of the following information of the third channel or the third signal according to the first signal: spatial filtering parameter information of the third channel or the third signal, or power parameter information of the third channel or the third signal.

Optionally, the TA information is a time difference between a start position of a first time unit and a start position of a second time unit, where the third channel or the third signal corresponds to the first time unit, and the second channel or the third signal corresponds to the second time unit. It is to be added that the first time unit may be an uplink time unit, and the second time unit may be a downlink time unit.

Optionally, the method includes at least one of the following:
 the first channel or the second channel or the third channel includes at least one of the following channels: a data channel, or a control channel;

the first signal or the third signal includes at least one of the following signals: a demodulation reference signal, a measurement reference signal, or a random access signal;

the second signal includes at least one of the following signals: a demodulation reference signal, a measurement reference signal, a synchronization signal, or a measurement reference signal of a tracking reference signal (TRS).

Optionally, an association relationship between the first channel or the first signal and the TA information is established; an association relationship between the second channel or the second signal and the TA information is established; or an association relationship between a combination of the first channel or the first signal and the second channel or the second signal and the TA information is established.

It is to be added that establishing the association relationship between the signal and the TA information includes at least one of the following: including information of the signal in configuration information of the TA information, including the TA information in configuration information of the signal, or determining the TA information according to the information of the signal.

Optionally, the step that the first communication node determines the TA information according to the second channel or the second signal includes: determining the TA information according to scrambling code information corresponding to the second channel or the second signal, determining the TA information according to a transmission parameter of a control channel resource in which the second channel or the second signal is located, or obtaining the TA information according to TA information included in configuration information of the second channel.

According to another embodiment of the present disclosure, a TA information determination method is further provided. The method includes steps described below.

In step one, a second communication node transmits signaling information to a first communication node, where the signaling information includes at least one of following association relationships:

an association relationship between a first channel or a first signal and TA information;
an association relationship between a second channel or a second signal and the TA information; or
an association relationship between a combination of the first channel or the first signal and the second channel or the second signal and the TA information.

In the above, the first channel or the first signal is a signal transmitted by the first communication node, and the second channel or the second signal is a signal received by the first communication node.

It is to be added that establishing the association relationship between the first signal and the TA information includes at least one of the following: including information of the first signal in configuration information of the TA information; including the TA information in configuration information of the first signal; or determining the TA information according to the information of the first signal. Other association relationships work in a similar way.

The above solution resolves the issue of the lack of a solution for determining a TA value for the terminal to transmit the signal in a multi-TRP transmission scenario in the related art, such that the TA value can be determined based on the association relationship subsequently.

Optionally, the TA information is the basis for the first communication node to transmit the third channel or the third signal, or the TA information is the basis for the first communication node to transmit the first channel or the second signal.

Optionally, the method further includes that the first channel or the second channel or the third channel includes at least one of the following channels: a data channel, or a control channel; the first signal and the third signal includes at least one of the following signals: a demodulation reference signal, a measurement reference signal, or a random access signal; and the second signal includes at least one of the following signals: a demodulation reference signal, a measurement reference signal, a synchronization signal, or a measurement reference signal as a TRS.

Optionally, the signaling information includes one of the following signaling information: the signaling information as high-layer signaling information, or the signaling information as physical layer signaling information.

According to another embodiment of the present disclosure, a TA information determination method is further provided. The method includes steps described below.

In step one, a first communication node receives configuration information of a third signal transmitted by a second communication node, where the configuration information includes TA information.

In step two, the first communication node transmits the third signal according to the TA information.

The above solution resolves the issue that the terminal cannot determine the TA value for transmitting an uplink signal in a multi-TRP transmission scenario in the related art, and provides a solution that the terminal determines the TA value according to configuration information.

Optionally, the step of receiving the configuration information of the third signal includes at least one of the following: receiving high-layer configuration information of the third signal, and determining the high-layer configuration information of the third signal as the configuration information of the third signal; or receiving physical layer control signaling for scheduling the third signal, where the physical layer control signaling includes the configuration information of the third signal.

Optionally, in the configuration information of the third signal, the TA information is jointly encoded with at least one of the following information: a spatial filtering parameter of the third signal, or a power parameter of the third signal.

The present disclosure will be described below in conjunction with specific embodiments.

Specific Embodiment One

The multi-TRP transmission is that a terminal can receive more than one PDSCHs simultaneously under one BWP, or the number of demodulation reference signal (DMRS) groups of one PDSCH is greater than 1, where different DMRS ports in one DMRS group satisfy a QCL relationship at least with respect to one type of QCL parameter, and different DMRSs in different DMRS groups do not satisfy the QCL relationship.

Specifically, multi-TRP transmission is described using two TRPs as an example. Specific scenarios are listed in Table 1. Table 1 is a schematic table of transmission scenarios under multi-TRP according to the present application.

TABLE 1

Figure 2:
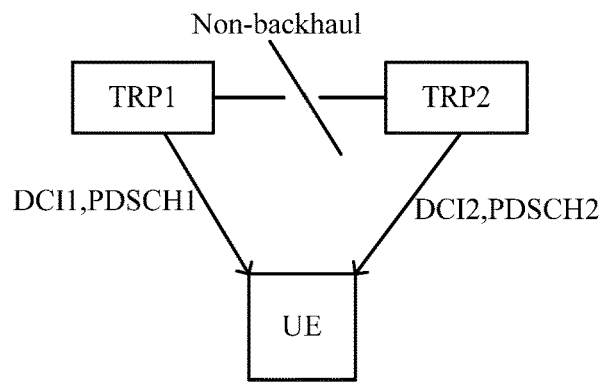
FIG. 2 is a schematic diagram one of a transmission scenario where a terminal receives PUSCHs transmitted by multiple TRPs according to the present disclosure.
Figure 3:
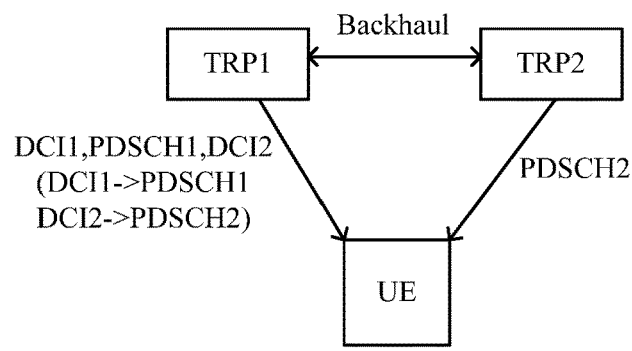
FIG. 3 is a schematic diagram two of a transmission scenario where a terminal receives PUSCHs transmitted by multiple TRPs according to the present disclosure.
Figure 4:
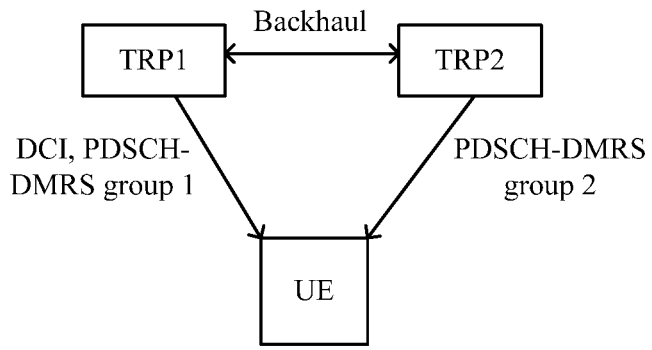
FIG. 4 is a schematic diagram three of a transmission scenario where a terminal receives PUSCHs transmitted by multiple TRPs according to the present disclosure.
Figure 5:
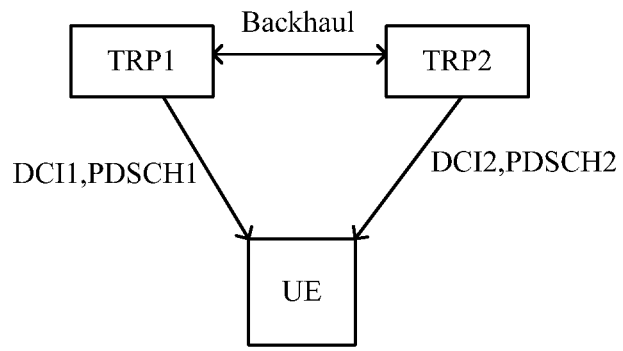
FIG. 5 is a schematic diagram four of a transmission scenario where a terminal receives PUSCHs transmitted by multiple TRPs according to the present disclosure.
Figure 6:
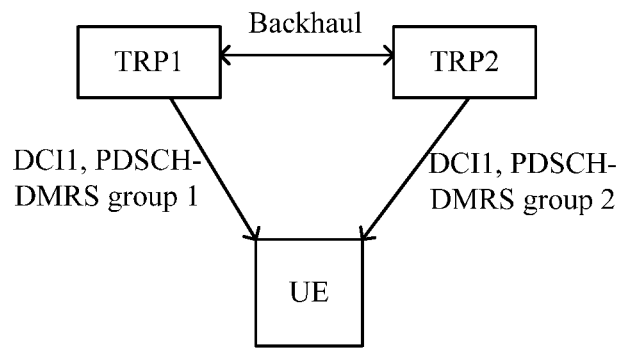
FIG. 6 is a schematic diagram five of a transmission scenario where a terminal receives PUSCHs transmitted by multiple TRPs according to the present disclosure.

| Scenario | Number of (DCI, PDSCH) groups | Content transmitted by TPR1 | Content transmitted by TPR2 | FIG. |
|---|---|---|---|---|
| Scenario 1: different DMRS groups correspond to different TRPs | 1 | DCI1, DMRS group1 | DMRS group2 | FIG. 4 |
| Scenario 2: different PDSCHs correspond to different TRPs | 2 | DCI1, DCI2, PDSCH1 | PDSCH2 | FIG. 3 |
| Scenario 3: different (DCI, PDSCH) groups correspond to different TRPs | 2 | DCI1, PDSCH1 | DCI2, PDSCH2 | FIG. 2 or FIG. 5 |
| Scenario 4: one DCI is transmitted on both TRPs, and different DMRS groups correspond to different TRPs | 1 | DCI1, DMRS group1 | DCI1, DMRS group2 | FIG. 6 |

FIG. 2 is a schematic diagram one of a transmission scenario where a terminal receives PUSCHs transmitted by multiple TRPs according to the present disclosure; FIG. 3 is a schematic diagram two of a transmission scenario where a terminal receives PUSCHs transmitted by multiple TRPs according to the present disclosure; FIG. 4 is a schematic diagram three of a transmission scenario where a terminal receives PUSCHs transmitted by multiple TRPs according to the present disclosure; FIG. 5 is a schematic diagram four of a transmission scenario where a terminal receives PUSCHs transmitted by multiple TRPs according to the present disclosure; and FIG. 6 is a schematic diagram five of a transmission scenario where a terminal receives PUSCHs transmitted by multiple TRPs according to the present disclosure. As shown in FIGS. 2 to 5, DCI1 schedules PDSCH1, and DCI2 schedules PDSCH2.

In FIG. 2, there is no ideal backhaul between TRP1 and TRP2. TRP1 and TRP2 each schedule one terminal independently. Considering that the settings of TRP1 and TRP2 are different, or considering that UE groups that TRP1 and TRP2 each serve are different, one terminal may receive PDSCH1 and PDSCH2 simultaneously in one BWP in the same time unit. PDSCH1 is transmitted through TRP1, and PDSCH2 is transmitted through TRP2. High-layer configuration information corresponding to PDSCH1 and PDSCH2 may be different.

Therefore, one BWP may include the configuration of multiple PDSCHs and multiple PDCCHs, and the relationship between the multiple PDSCHs and multiple PDCCHs included in the BWP is further configured, such that when a PDSCH is scheduled in DCI, a high-layer parameter of the PDSCH is obtained through configuration information of the PDSCH corresponding to the PDCCH in which the DCI is located.

For example, the configuration is as follows.

```
"DownlinkBWP-Dedicated ::=        SEQUENCE {
    pdcch-Config1
        pdcch-Config2
        pdsch-Config1
pdsch-Config2                      }"
```

The configuration information of a PDCCH configures CORESET information, Search space information, etc., included in the PDCCH. The configuration information of a PDSCH further configures the following information: scrambling information, demodulation reference signal information, a TCI state pool, resource allocation information, rate mating information, MCS reference table information, precoding resource group information, and rate mating information. For example, the configuration of the configuration information of a set of PDSCHs may correspond to a PDSCH-Config in the configuration in the 3GPP TS 38.331.V15.0.0, and the configuration of the configuration information of a set of PDCCHs may correspond to a PDCCH-Config in the configuration in the 3GPP TS 38.331.V15.0.0.

In the above manner, different TRPs correspond to different (PDCCH, PDSCH) combinations, but for the case that one BWP includes multiple PDSCHs and one PDCCH, and a correspondence between multiple CORESETs included in the PDCCH and the multiple PUSCHs is established, it is not excluded in the embodiment. For example, the configuration is as follows.

```
"DownlinkBWP-Dedicated ::=        SEQUENCE {
    pdcch-Config
        pdsch-Config1
pdsch-Config2                      }"
```

The PDCCH includes multiple CORESETs, and a correspondence between multiple CORESETs and multiple pieces of PDSCH configuration information is established. The DCI schedules one PDSCH, and indexes according to high-layer configuration information of a PDSCH corresponding to a CORESET/Search space in which the DCI is located. The high-layer configuration parameter of the PDSCH is obtained according to high-layer configuration information of a PDSCH corresponding to the configuration information index information. Specifically, for example, the PDCCH includes CORESET1 and CORESET2. CORESET1 corresponds to PDSCH-Config1, and CORESET2 corresponds to PDSCH-Config2, such that the high-layer parameter of the DCI-scheduled PDSCH transmitted in CORESET1 is obtained according to PDSCH-Config1, and the high-layer parameter of the DCI-scheduled PDSCH transmitted in CORESET2 is obtained according to PDSCH-Config2.

Alternatively, an association between N sets of PDSCH configuration information included in one BWP and multiple scrambling sequence generation parameters of one CORESET is established. For example, one CORESET corresponds to two scrambling sequence generation parameters C-RNTI, i.e., {C-RNTI1, C-RNTI2}, a correspondence between C-RNTI1 and PDSCH1 is established, and a correspondence between C-RNTI2 and PDSCH2 is established. In this way, a high-layer parameter of the PDSCH scheduled by the DCI which is successfully decoded based on C-RNTI1 is obtained according to PDSCH-Config1, and a high-layer parameter of the PDSCH scheduled by the DCI which is successfully decoded based on C-RNTI2 is obtained according to PDSCH-Config2. The above is about that one CORESET corresponds to two C-RNTIs. In this embodiment, a CORESET is only associated with a C-RNTI, but is associated with multiple virtual cell numbers $n_{ID}$. For example, $n_{ID}^1$ corresponds to PDSCH-Config1, and $n_{ID}^2$ corresponds to PDSCH-Config2, such that a high-layer parameter of the PDSCH scheduled by the DCI which is successfully decoded based on $n_{ID}^1$ is obtained according to PDSCH-Config1, and a high-layer parameter of the PDSCH scheduled by the DCI which is successfully decoded based on $n_{ID}^2$ is obtained according to PDSCH-Config2.

The information sequence b(i) after PDCCH channel coding is scrambled by a sequence c(i), as shown in Formula (1), where c(i) is an i-th value of a random sequence, and an initialization value of this random sequence is obtained according to Formula (2).

$$\tilde{b}(i)=(b(i)+c(i)) \bmod 2 \qquad (1)$$

$$c_{init}=(n_{RNTI} \cdot 2^{16}+n_{ID}) \bmod 2^{31} \qquad (2)$$

$n_{RNTI}$, when it is on a specific control channel, is determined by the above C-RNTI, and nip may be a cell identifier (ID).

The above is about that a correspondence between multiple downlink control channel resources and multiple PDSCHs is established. Similarly, a correspondence between multiple downlink control channel resources and multiple PUSCHs may be established, or a correspondence between multiple downlink control channel resources and multiple PUCCHs may be established. One control channel resource may be one of the following: one PDCCH corresponding to the PDCCH configuration information, one CORESET, one Search space, one search space corresponding to an aggregation level, and a parameter corresponding to the scrambling sequence of the DCI.

In the above embodiment, one BWP includes configurations of multiple PDSCHs. In another configuration information of this embodiment, one BWP includes one PDSCH, the PDSCH has multiple sets of high-layer parameter configurations which belong to one transmission parameter set, and which set of high-layer parameter configurations in multiple sets of high-layer parameter configurations belonging to one transmission parameter set and configured in the PDSCH high-layer configuration parameters is high-layer parameters corresponding to the scheduled PDSCH is further indicated in the DCI scheduling the PDSCH.

Similarly, a correspondence between multiple control channel resource in one BWP and multiple uplink control channel configurations included in one uplink BWP may be established, and/or a correspondence between multiple control channel resource in one BWP and multiple sets of uplink control channel configurations included in one uplink BWP may be established. The configuration of the configuration information of a set of PUSCHs may correspond to a PUSCH-Config in the configuration in the 3GPP TS 38.331.V15.0.0, and the configuration of the configuration information of a set of PUCCHs may correspond to a PUCCH-Config in the configuration in the 3GPP TS 38.331.V15.0.0.

Specific Embodiment Two

In this embodiment, a correspondence between P control channel resources and Q sets of configuration information of one transmission parameter set needs to be determined, where the one transmission parameter is a transmission parameter of a channel or a signal scheduled by the control channel resource. That is, configuration information of the one transmission parameter set corresponding to one control channel resource needs to be determined.

For example, there are two TRPs transmitted in FIG. 2. There is no ideal backhaul between the two TRPs. TRP1 and TRP2 schedule the UE independently to increase spectral efficiency. TRP1 and TRP2 schedule the UE in the same BWP. Although beam isolation between TRP1 and TRP2 is considered good, robustness between reference signals or control channels still needs to be guaranteed, and/or if users served under TRP1 and TRP2 have busy traffic and different delay requirements, the configurations of channels/signals separately scheduled by TRP1 and TRP2 may allow to be different, so that for the UE, one transmission parameter under one BWP may correspond to multiple sets of configurations.

The transmission parameter in the one transmission parameter set includes at least one of following parameters: process number set information, uplink control channel resource set information, a demodulation reference signal port et, demodulation reference signal information, quasi co-located reference signal set information, TCI state pool information, downlink data channel transmission parameter information, an uplink data channel transmission parameter, uplink control channel information, a PRB bundling size, rate mating information, measurement reference signal information, code block group (CBG) information, scrambling sequence generation parameter information, or TA information.

For example, CORESET1 is transmitted by TRP1, and the PDCCH transmitted in CORESET1 schedules the downlink channel/signal transmitted by TRP1 to the UE, or the uplink channel/signal transmitted by the UE to TRP1. CORESET2 is transmitted by TRP2, and the PDCCH transmitted in CORESET2 schedules the downlink channel/signal transmitted by TRP2 to the UE, or the uplink channel/signal transmitted by the UE to TRP2.

Since TRP1 and TRP2 can schedule PDSCH/CSI-RS/CORESET/PUCCH/PUSCH/SRS/SR, etc. in the same BWP, in order to ensure the signal accuracy, a process number set of a channel scheduled by CORESET1 needs to be determined, so that no confusion between PDSCH/PUSCH transmitted in TRP1 and TRP2 may occur because TRP1 and TRP2 each transmit a channel independently and there is no ideal backhaul between TRP1 and TRP2 to communicate in real time. For example, the process number set configured in CORESET1 is {0, 1, 2, 3}, and the process number of the PDSCH/PUSCH indicated in the PDCCH included in CORESET1 is a relative index in the process number set {0, 1, 2, 3}; the process number set configured in CORESET2 is {4, 5, 6, 7}, and the process number of the PDSCH/PUSCH indicated in the PDCCH included in CORESET2 is a relative index in the process number set {4, 5, 6, 7}, for example, if the relative index of the process number indicated in the PDCCH is 0, the process number corresponding to the PDSCH/PUSCH is 4. If the process number set and the control channel resource are not corresponded, both CORESET1 and CORESET2 will schedules the process number 0. In this case, the terminal considers CORESET1 and CORESET2 as the same process data and merges CORESET1 and CORESET2, but actually CORESET1 and CORESET2 are different data transmitted by different TRPs and cannot be merged.

Similarly, the association between the CORESET and the uplink control channel resource set may be established. For example, CORESET1 corresponds to PUCCH resource set 1, and CORESET2 corresponds to PUCCH resource set 2. The intersection set of resources included in PUCCH resource set 1 and PUCCH resource set 2 is null, and especially the intersection set of PUCCH sets corresponding to dynamic signaling is not null, such that CORESET1 and CORESET2 each can independently schedule resources in PUCCH resource sets. The PUCCH resource includes a time domain resource, a frequency domain resource and a spatial domain resource. The spatial domain resource of the downlink reference signal is obtained through the QCL reference signal about the spatial Rx parameter of the downlink reference signal configured by the TCI-state, and the spatial domain resource of the uplink reference signal is obtained through spatial filtering parameter indication information (spatialRelationInfo) or through the precoding indication information of this uplink reference signal. If any one or more of time domain resources, frequency domain resources and spatial domain resources corresponding to two PUCCH resources are different, and the two PUCCH resources are different.

For example, if PUCCH resource 1 corresponds to {time domain resource 1, frequency domain resource 1, spatial domain resource 1} and PUCCH resource 2 corresponds to {time domain resource 1, frequency domain resource 1, spatial domain resource 2}, PUCCH resource 1 and PUCCH resource 1 are two different resources. In this way, it can be ensured that CORESET1 and CORESET2 do not need to interact with each other and independently schedule PUCCH resources. Otherwise, they may schedule the same PUCCH resource, which causes that when two pieces of uplink control information need to be transmitted simultaneously on the same PUCCH resource, only one piece of uplink control information can be transmitted on the PUCCH resource.

Figure 10:
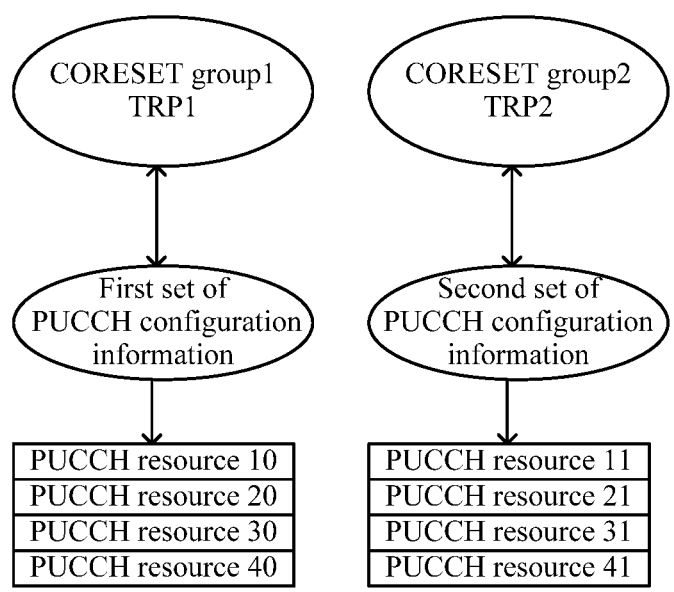
FIG. 10 is a schematic diagram showing that different TRPs correspond to different PUCCH resource sets according to the present application.

FIG. 10 is a schematic diagram showing that different TRPs correspond to different PUCCH resource sets according to the present application. As shown in FIG. 10, due to non-backhaul, if the PUCCH resources scheduled by two TRPs are the same, it results in strong interference between PUCCHs. The above four PUCCHs correspond to PUCCH resource domains notified by 2 bits in DCI. When the two PUCCH resource sets are guaranteed to be different, interference may be reduced.

Similarly, the correspondence between the CORESET and the DMRS port set may be established. Therefore, different TRPs are allowed to correspond to different DMRS port sets, and the PDCCH transmitted in the CORESET further indicates relative information of a DMRS corresponding to the scheduled PDSCH/PUSCH in the DMRS port set.

Similarly, the correspondence between the CORESET and the DMRS information may be established. Therefore, DMRS configurations corresponding to different TRPs are the same, or DMRS information corresponding to different TRPs is guaranteed to be the same. The DMRS information includes at least one of the following information: a DMRS pattern type (DMRS-Type), the number of continuous time domain symbol groups occupied by a DMRS (DMRS-AdditionalPosition), a maximum value of the number of time domain symbols included in a continuous time domain symbol group occupied by a DMRS (maxLength), a generation parameter generating a DMRS sequence, a start time domain symbol position 10 of a DMRS, the number of time domain symbols included in a continuous time domain symbol group occupied by a DMRS, whether transform precoding on channels transmitted by one or more third communication nodes to the first communication node is enabled (equivalent to: whether SC-DMRS is enabled), DMRS port information, a frequency domain group in which a DMRS is located, or a power difference between a DMRS and a channel corresponding to the DMRS.

Similarly, the association between the CORESET and the TCI state pool may be established. For example, CORESET1 corresponds to TCI state pool1, and CORESET2 corresponds to TCI state pool2. The TCI state pool includes one or more TCI states, the TCI state includes one or more QCL reference signal sets to indicate a QCL reference signal set corresponding to one or more port groups, and the QCL reference signal set of a port group represents that a port in the port group and a reference signal in the QCL reference signal set satisfy a QCL relationship with respect to a type of QCL parameters. The port in a port group satisfies the QCL relationship, reference signals in different port groups do not satisfy the QCL relationship, and the port may be a DMRS port, or may be a measurement reference signal port. The TCI state corresponding to the QCL reference signal set of the channel or signal corresponding to CORESET1 comes from TCI state pool1, where the channel or signal corresponding to CORESET1 includes a channel or signal scheduled by a PDCCH in CORESET1, and/or includes a channel or signal scheduled by high-layer signaling, where the high-layer signaling corresponds to a PDSCH scheduled by the PDCCH in the CORESET1. The TCI state corresponding to the QCL reference signal set of the channel or signal corresponding to CORESET2 comes from TCI state pool2.

Similarly, the correspondence may be established between the CORESET and one or more sets of PDSCHs configured by the high layer, where configuration information of a set of PDSCHs includes configuration information of multiple transmission parameters of the PDSCH, such as PDSCH-config described above, such that transmission parameters of the PDSCH transmitted by different TRPs to the UE are different.

Similarly, the correspondence between the CORESET and the transmission parameters of the uplink data channel may be established. Therefore, configuration information of uplink data channels transmitted to different TRPs is allowed to be different.

Similarly, the correspondence between the CORESET and the rate mating information may be established. Therefore, rate mating information of different TRPs is allowed to be different. The rate mating information may be rate mating information configured by the radio resource control (RRC) signaling, or may be rate mating information notified by the media access control control element (MAC-CE), or may be a rate mating information set corresponding to rate mating information notified by the DCI.

Similarly, the correspondence between the CORESET and the measurement reference signal may be established. Therefore, different TRPs are allowed to schedule measurement reference signals from different measurement reference signal resource pools, and measurement reference signals scheduled by two TRPs can be guaranteed to have no conflict, especially for uplink measurement reference signals. If two TRPs schedule the same SRS resource, especially when the terminal decides beams of the SRS resource, when two TRPs schedule the same SRS resource, the terminal needs to perform transmission on TRP1 and TRP2 using the same SRS resource and different transmission beams, which may result in inaccurate uplink measurement. On the other hand, if time frequency resources occupied by two TRPs for scheduling channel state information-reference signals (CSI-RSs) are the same, receiving beam resources are also the same, but their transmission beams are actually different: one is a transmission beam of TRP1 while the one is a transmission beam of TRP2, and thus what the terminal actually measures is an overlaid channel of the two transmission beams. However, since there is no real-time interaction between TRP1 and TRP2 and TRPs do not know that the measurement is the overlaying effect of the two, TRP1 and TRP2 each preferably corresponds to a respective measurement reference signal pool, and two measurement reference signal resources in different measurement reference signal pools are preferably different. That resources of the two measurement reference signals are different indicates that at least one of the following resources corresponding to the two measurement reference signal resources is different: time domain resources, frequency domain resources, or space domain resources. Alternatively, only one of the two TRPs controls the measurement reference signal, but the aperiodic measurement reference signal resource pool corresponding to each CORESET should be different.

Similarly, the association between the CORESET and the CBG may be established. Therefore, resource allocation granularities of different TRPs are allowed to be different. Of course, the association between the CORESET and the time domain resource allocation parameter and/or the frequency domain resource allocation parameter, such as a resource granularity, a resource allocation manner and a mapping manner from a physical resource to a virtual resource, may also be established.

Similarly, the association between the CORESET and the generation parameter information of the scrambling sequence may be established, where the scrambling sequence may be a scrambling sequence of the data channel, or may be a scrambling sequence of the control channel. Therefore, the data channels of different TRPs are allowed to use different scrambling sequences, reducing the interference between the two. The scrambling sequence is used for scrambling bit information after channel coding on the data channel and then modulating the bit information.

Similarly, the correspondence between the CORESET and the TA information may be established. Therefore, the TA of the uplink channel/signal corresponding to this CORESET adopts the TA value of this CORESET. The channel or signal corresponding to the one CORESET represents that the control signaling for scheduling the channel or signal is included in a control channel included in the control channel resource, or is included in a channel scheduled by the control channel included in the control channel resource. For example, this channel/signal is a channel/signal directly scheduled by a PDCCH included in this CORESET, or is a channel/signal scheduled by the high-layer signaling of this channel/signal, such as a periodic or aperiodic channel/signal. The high-layer signaling that schedules this channel/signal is included in a PDSCH scheduled by the PDCCH included in this CORESET. Therefore, TAs used for transmitting different TRPs are allowed to be different. Optionally, since transmission delays between different TRPs and UEs are different and downlink slot boundaries corresponding to TRP1 and TRP2 should be aligned, there should be two downlink timings at the UE terminal, where the two timings each are respectively used for receiving signals transmitted by TRP1 and signals transmitted by TRP2. Therefore, the TA of the uplink channel/signal corresponding to CORESET1 is the time difference between a start position of a time unit 1 transmitting the above uplink channel/signal and a start position of a time unit 2. The time unit 2 is a downlink time unit. The time unit index corresponding to the time unit 1 and the time unit 2 is the same. The start position of the time unit 2 is obtained according to a start position of a time unit used when the terminal receives CORESET1.

The above description is to establish the correspondence between the CORESET and the transmission parameter set, and there may be a case that a CORESET corresponds to multiple sets of configuration information of a transmission parameter set, and the DCI signaling indicates which set of configuration information corresponds to the transmission parameter in the one transmission parameter set of the channel/signal scheduled by the DCI signaling. For example, a CORESET corresponds to multiple sets of PDSCH high-layer configuration information, and then it may determine the high-layer transmission parameter of the PDSCH scheduled through the DCI signaling is based on which set of PDSCH high-layer coordination information, or a DMRS index indicated in the DCI is a relative index of a DMRS port in which set of DMRS port sets, or the high-layer transmission parameter of the PUCCH scheduled by the DCI is which set in multiple sets of PUCCH configuration information corresponding to the CORESET. As shown in FIG. 3, one TRP transmits two DCI, and the other TRP only transmits the PDSCH. Assumed that DCI1 and DCI2 are transmitted in the same CORESET, then two sets of configurations of one transmission parameter set corresponding to the CORESET each correspond to the channel or signal transmitted by TRP1 and the channel or signal transmitted by TRP2 respectively, and which set of configurations that the PDSCH/PUSCH scheduled by the DCI uses is specifically indicated in this DCI.

The above description is to establish the correspondence between a control channel resource and one or more sets of configuration information of a transmission parameter set, where the control channel resource is a CORESET. The control channel resource described herein, for example, may be one of the following: a search space, a search space corresponding to an aggregation level, or a set of high layer-configured PDCCH resources, or only includes a PDCCH of the DCI, a candidate, and a scrambling sequence generation parameter of a CORESET. For example, like $n_{RNTI}$ and/or nip in Formula (2), the correspondence between the scrambling sequence generation parameter and one or more sets of configuration information of the one transmission parameter set is established.

The above description is to establish the correspondence between a control channel resource and one or more sets of configuration information of one transmission parameter set, and the correspondence between a control channel resource set and one or more sets of configuration information of one transmission parameter set may also be established.

Specific Embodiment Three

Figure 9:
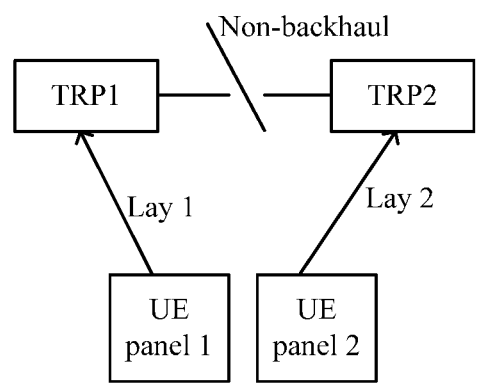
FIG. 9 is a schematic diagram one showing that a terminal uses multiple panels to transmit an uplink signal to multiple TRPs according to the present disclosure.

In this embodiment, the terminal uses multiple panels to communicate with multiple TRPs. FIG. 9 is a schematic diagram one showing that a terminal uses multiple panels to transmit uplink signals to multiple TRPs according to the present disclosure. As shown in FIG. 9, uplink channels/signals transmitted to different TRPs should use different TA values. For the above, at least one of the following schemes may be used.

Scheme 1: establish the TA value corresponding to the channel/signal in the configuration information of the channel/signal, where the configuration information may be high-layer configuration information, or may be physical layer dynamic control information.

Scheme 2: configure TA information in the uplink sounding reference signal (SRS), and obtain TA information of PUSCH/PUCCH according to SRS information, where the spatial filtering parameter and/or precoding parameter and/or power parameter of PUSCH/PUCCH are indicated through the SRS information.

Scheme 3: configure TA information in the configuration information of a control channel resource, and obtain the TA value of the uplink channel/signal corresponding to the control channel resource according to the TA information configured in the control channel resource, where the uplink channel/signal corresponding to the control channel resources represents that the control signaling for scheduling the uplink channel/signal is included in the control channel included in the control channel resource, and/or the control signaling for scheduling the uplink channel/signal is included in the PDSCH scheduled by the control channel included in the control channel resource.

Figure 7:
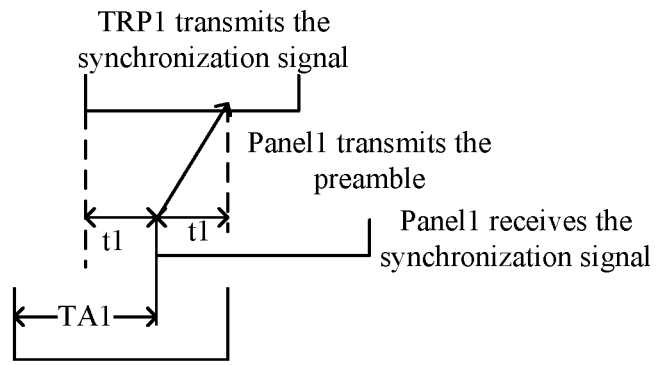
FIG. 7 is a schematic diagram one showing using the same downlink timing when a terminal uses multiple panels to transmit an uplink signal to multiple TRPs according to the present disclosure.
Figure 8:
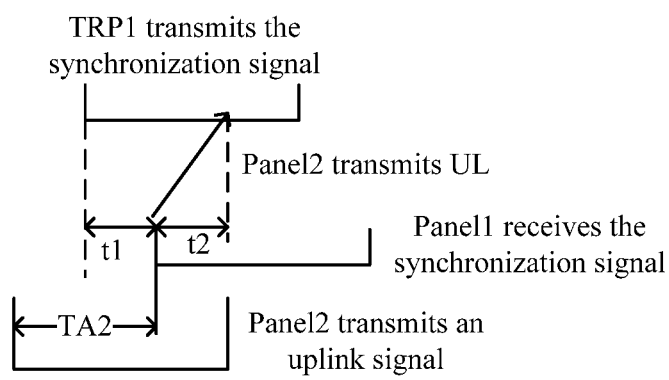
FIG. 8 is a schematic diagram two showing using the same downlink timing when a terminal uses multiple panels to transmit an uplink signal to multiple TRPs according to the present disclosure.

The above schemes only notify the TA value of one uplink channel/signal, and downlink synchronization uses one set, that is, as shown in FIGS. 7 to 8, the TA values of signals transmitted by panel1 and panel2 are both the time advance for the panel1 to receive the downlink synchronization signal. More precisely, since downlink timing of downlink signals of different TRPs to the UE is also different, when one TA value is notified, a TA value of which downlink signal that this TA value is relative to should be further notified, that is, a TA value corresponds to a (one downlink channel/signal, one uplink channel/signal) combination, where the TA is a time difference between the start position of the time unit 1 that transmits the uplink channel/signal and the start position of the time unit 2, where the time unit 1 is an uplink time unit, the time unit 2 is a downlink time unit, the start position of the time unit 2 is based on a start position of a downlink time unit 3 in which the downlink channel/signal corresponding to the TA of the terminal is located, and an integer number of time units are included between the time unit 2 and the time unit 3.

Specifically, for example, if TRP2 does not transmit the synchronization signal, the downlink synchronization of panel2 of the UE is determined according to the synchronization signal transmitted by TRP1. The TA amount when the UE uses panel1 to transmit the uplink signal to TRP1 is TA1, and the TA amount when the UE uses panel2 to transmit the uplink signal to TRP2 is TA2. As shown in FIGS. 7 to 8, panel1 receives the downlink signal transmitted by TRP1, where the transmission delay between the transmission of panel1 and the reception of TRP1 is t1, and then transmits uplink signals to TRP1 and TRP2 respectively. Since uplink transmission delays are different, the uplink transmission delay in which the uplink signal transmitted by panel1 arrives at TRP1 is t1, and the uplink transmission delay in which the uplink signal transmitted by panel2 arrives at TRP1 is t2.

FIG. 7 is a schematic diagram one showing using the same downlink timing when a terminal uses multiple panels to transmit an uplink signal to multiple TRPs according to the present disclosure. FIG. 7 shows that the time unit boundary of the uplink signal transmitted by panel1 is obtained according to the downlink time unit boundary obtained according to the downlink synchronization signal transmitted by TRP1 and received by panel1. FIG. 7 is a schematic diagram showing that the UE receives the synchronization signal according to the specific embodiment four of the present disclosure.

FIG. 8 is a schematic diagram two showing using the same downlink timing when a terminal uses multiple panels to transmit uplink signals to multiple TRPs according to the present disclosure. FIG. 8 shows that the time unit boundary of the uplink signal transmitted by panel2 is obtained according to the downlink time unit boundary obtained according to the downlink synchronization signal transmitted by TRP1 and received by panel1.

Here, t1 is downlink transmission delay, and when uplink transmission delay when panel1 transmits a preamble to TRP1 is also assumed to be t1, TA1=2t1.

When the downlink frame timing of panel2 is in line with the downlink frame timing of panel1, the accurate value of TA2 should be TA2=t1+t2 (the difference between t2 and t1 is mainly due to that the distance from the UE to TRP1 is different to the distance from the UE to TRP2, and the beam of the uplink of panel1 is different to the beam of the uplink of panel2, for example, some are direct paths and some are not direct paths).

In this case, if the uplink of panel2 is transmitted in TA1, the arrival time of the uplink signal at panel2 will be earlier or later than the frame timing at panel2. The downlink frame timing of panel2 should exactly be in line with the timing of panel2 receiving TRP2, otherwise the first time domain symbol transmitted downlink by TRP2 will not be the first time domain symbol when arriving at panel2.

Alternatively, when the downlink frame timing of panel2 is in line with timing for panel2 receiving the downlink synchronization signal transmitted by TRP1, TA2=t12+t2. In this case, the difference between t12 and t1 is due to that the beam for panel2 receiving the synchronization signal transmitted by TRP1 is different from the beam for panel1 receiving the synchronization signal transmitted by TRP1.

Alternatively, the TA amount can be adjusted after TRP2 receives the uplink signal transmitted by panel2. However, this TA amount is adjusted only for the uplink signal of panel2, and thus uplink signals of panel1 and panel2 need to be further distinguished, for example, through different SRS resource groups. For example, panel1 and panel2 correspond to SRS resource group 1 and SRS resource group 2 respectively, or panel1 and panel2 correspond to the uplink signal scheduled by CORESET group 1 and the uplink signal scheduled by CORESET group 2 respectively.

In the above schemes, the downlink frame timing of panel2 is in line with the timing for panel1 receiving the synchronization signal transmitted by the TRP1 (the transmission delay is t1), or in line with the timing for panel2 receiving the synchronization signal transmitted by TRP1 (the transmission delay is t12). However, the downlink timing of panel2 actually should be in line with the timing for panel2 receiving the synchronization signal transmitted by TRP2 (the transmission delay is t3). When the difference between t3 and t1/t12 is large, the first time domain symbol transmitted by TRP2 is not the first time domain symbol when reaching panel2. It is to be further considered the situation that the downlink frame timing of panel2 makes TRP2 transmit the downlink signal, and panel2 is adjusted. However, in this case, the advance definition for the TA amount should be at per-panel level, that is, TA1 is the advance of the uplink signal of panel1 with respect to the downlink frame timing of panel1, and TA2 is the advance of the uplink signal of panel2 with respect to the downlink frame timing of panel2.

Optionally, the following manner may also be executed: by notifying the terminal by the base station, or in a predefined manner:
  establishing the association between the CORESET/SRS/ scrambling code/cell ID/spatial parameter and the TA;
  establishing the association between the downlink reference signal and the TA; and
  establishing the association between the combination (downlink reference signal, uplink reference signal) and the TA.

Specific Embodiment Four

Specifically, the data of TRP1 and the data of TRP2 are independent, and thus TRP1 and TRP2 each has their own process number. However, in order to further reduce the number of bits occupied by the process number in the DCI, different TRPs may correspond to different process number sets. For example, TRP1 corresponds to the process number set {1, 2, 3, 4}, and TRP2 corresponds to the process number set {5, 6, 7, 8}. Of course, TRP2 can be configured with the process number set {1, 2, 3, 4} in an ideal Backhaul scenario. The base station further dynamically indicate the specific process numbers in the process number set, and obtains the bit number of the process number in the DCI according to the configured process number set. The association relationship between the process number and the following information may be established, including: establishing the association relationship between the TCI state group or TCI state and the process number. When the TCI of the Candidate belongs to group 1, the process number set is a first set {1, 2, 3, 4}; when the TCI of the Candidate belongs to group 2, the process number set is a first set {5, 6, 7, 8}; and when the process numbers of two PDSCHs are the same, one ACK/NACK only needs to be fed back. That is, the process number indicated in the DCI is index information in the first process number set, where the first process number set is configured in the TCI state corresponding to the QCL reference signal set of the DMRS of the data channel, or the first process number set is configured in a TCI state group to which the TCI state corresponding to the QCL reference signal set of the DMRS of the data channel belongs.

Similarly, the TCI state or TCI state group may be configured with at least one of the following information of the data channel: BWP set information, DMRS port set information, DMRS information, quasi co-located reference signal set information, PRB bundling size indication information, rate mating indication information, carrier indicator indication information, measurement reference signal information, a generation parameter of a scrambling sequence, control channel port information, a time domain resource allocation parameter, frequency domain resource allocation parameter or aperiodic measurement reference signal information.

From the description of the above-mentioned implementations, it will be apparent to those skilled in the art that the method in the embodiment may be implemented by software plus a necessary general-purpose hardware platform, or may, of course, be implemented by hardware. However, in many cases, the former is a preferred implementation. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the methods according to each embodiment of the present disclosure.

Embodiment Two

This embodiment further provides a configuration information transmission device. The device is used for implementing the above-mentioned embodiments and preferred embodiments. What has been described will not be repeated. As used below, the term "module" may be software, hardware or a combination thereof capable of implementing predetermined functions. The apparatuses in the embodiment described below are preferably implemented by software, but implementation by hardware or by a combination of software and hardware is also possible and conceived.

According to another embodiment of the present disclosure, a configuration information transmission device is further provided. The device includes a first transmitting module.

The first transmitting module is configured to transmit configuration information, where the configuration information is configuring N sets of data channel configuration information and/or M sets of control channel configuration information for one frequency domain bandwidth.

N and M are integers greater than or equal to 1.

It is to be added that one set of control channel resource configuration information may be one of the following configuration information: one set of PDCCH configuration information, one set of CORESET configuration information, one set of search space configuration information, one set of search space configuration information corresponding to an aggregation level, or one set of PUCCH configuration information.

The above solution resolves the issue of the lack of data transmission between multiple TRPs and a terminal in the related art. Multiple sets of configuration information are configured for one frequency domain bandwidth, such that different configuration information can be used in multi-TRP transmission, thereby realizing data transmission between multiple TRPs and a terminal.

Optionally, the device is further configured to execute at least one of the following operations:

a correspondence between N1 sets of data channel configuration information included in a first frequency domain bandwidth and M1 sets of control channel resource configuration information included in a second frequency domain bandwidth is established through signaling information and/or an agreed manner;

a correspondence between N2 sets of control channel configuration information of a third frequency domain bandwidth and M2 sets of control channel resource configuration information of a fourth frequency domain bandwidth is established through signaling information and/or an agreed manner;

a correspondence between C1 sets of reference signal configuration information included in a fifth frequency domain bandwidth and M3 sets of control channel resource configuration information included in a sixth frequency domain bandwidth is established through signaling information and/or an agreed manner;

a correspondence between N4 sets of control channel configuration information of a seventh frequency domain bandwidth and D2 sets of control channel resource configuration information included in one set of control channel configuration information of an eighth frequency domain bandwidth is established through signaling information and/or an agreed manner;

one set of data channel configuration information includes at least one of following information corresponding to a set of data channels: process number set information, or TA information;

one set of data channel configuration information includes multiple sets of configuration information of one transmission parameter set of a set of data channels, where the transmission parameter set includes at least one of following parameters: process number set information, BWP set information, DMRS port set information, DMRS information, quasi co-located reference signal set information, TCI state pool indication information, PRB bundling size indication information, rate mating indication information, carrier indicator indication information, a generation parameter of a scrambling sequence, TA information, control channel port information, a time domain resource allocation parameter, or a frequency domain resource allocation parameter.

In the above, N1, N2, N3, N4, M1, M2, D1, D2, M3 and C1 are positive integers greater than or equal to 1.

It is to be added is that the above correspondence may be: the control channel configuration information is used for scheduling which data channel; or a downlink control channel is used for controlling which uplink control channel; or which set of data channel configuration information corresponds to which set of control channel configuration information. For example, when downlink BWP1 includes configuration information of M1 sets of PDCCHs and downlink BWP2 includes configuration information of N1 sets of PDSCHs, which set of PDSCHs in the N1 sets of PDSCHs included in BWP2 is a PDSCH in BWP2 scheduled in a PDCCH of BWP1 needs to be indicated.

Optionally, the above frequency domain bandwidths may include at least one of the following.

the first frequency domain bandwidth and the second frequency domain bandwidth are downlink frequency domain bandwidths;

the first frequency domain bandwidth is an uplink frequency domain bandwidth, and the second frequency domain bandwidth is a downlink frequency domain bandwidth;

the third frequency domain bandwidth is an uplink frequency domain bandwidth, and the fourth frequency domain bandwidth is a downlink frequency domain bandwidth;

the fifth frequency domain bandwidth and the sixth frequency domain bandwidth are downlink frequency domain bandwidths; or the fifth frequency domain bandwidth is an uplink frequency domain bandwidth, and the sixth frequency domain bandwidth is a downlink frequency domain bandwidth.

Optionally, the device is further configured to execute at least one of the following operations.

First control signaling in the second frequency domain bandwidth schedules a first data channel in the first frequency domain bandwidth, where a transmission parameter of the first control signaling is obtained according to one set of control channel resource configuration information in the M1 sets of control channel resource configuration information included in the second frequency domain bandwidth, and a transmission parameter of the first data channel is obtained according to one set of data channel configuration information in the second frequency domain bandwidth which has a correspondence with the one set of control channel resource configuration information.

Second control signaling in the fourth frequency bandwidth schedules a third control channel in the third frequency bandwidth, where a transmission parameter of the second control signaling is obtained according to one set of control channel resource configuration information in the M2 sets of control channel resource configuration information included in the fourth frequency domain bandwidth, and a transmission parameter of the third control channel is obtained according to one set of control channel configuration information in the third frequency bandwidth which has a correspondence with the one set of control channel resource configuration information.

Third control signaling in the sixth frequency domain bandwidth schedules a second data channel in the fifth frequency domain bandwidth, where a transmission parameter of the third control signaling is obtained according to one set of control channel resource configuration information in one piece control channel configuration information in the sixth frequency domain bandwidth (which may be one set of control channel resource configuration information in the D1 sets of control channel resource configuration information included in the sixth frequency domain bandwidth described above), and a transmission parameter of the second data channel is obtained according to one set of data channel configuration information in the fifth frequency domain bandwidth which has a correspondence with the one set of control channel resource configuration information.

Fourth control signaling in the eighth frequency domain bandwidth schedules a fourth control channel in the seventh frequency domain bandwidth, where a transmission parameter of the fourth control signaling is obtained according to one set of control channel resource configuration information in one piece of control channel configuration information in the eighth frequency domain bandwidth (which may be one set of control channel resource configuration information in the D2 sets of control channel resource configuration information included in the eighth frequency domain bandwidth described above), and a transmission parameter of the fourth data channel is obtained according to one set of control channel configuration information in the seventh frequency domain bandwidth which has a correspondence with the one set of control channel resource configuration information.

Optionally, the device is configured to execute at least one of the following operations.

First control signaling is transmitted, where the first control signaling is used for configuring or scheduling a data channel in one frequency domain bandwidth, and the first control signaling includes configuration information index information of N5 sets of data channel configuration information included in the one frequency domain bandwidth, where a transmission parameter of the data channel is obtained according to data channel configuration information corresponding to the index information.

Second control signaling is transmitted, where the second control signaling is used for configuring or scheduling a control channel in one frequency domain bandwidth, and the second control signaling includes configuration information index information of N6 sets of control channel configuration information included in the one frequency domain bandwidth, where a transmission parameter of the control channel is obtained according to control channel resource configuration information corresponding to the index information.

Third control signaling is transmitted, where the third control signaling is used for configuring or scheduling a measurement reference signal resource in one frequency domain bandwidth, and the third control signaling includes configuration information index information of C2 sets of measurement reference signal configuration information included in the one frequency domain bandwidth, where a transmission parameter of the measurement reference signal resource is obtained according to measurement reference signal configuration information corresponding to the index information.

In the above, N5, N6 and C2 are positive integers greater than or equal to 1.

Optionally, the first control signaling is physical layer control signaling, the second control signaling is physical layer control signaling, and the third control signaling is physical layer control signaling.

According to another embodiment of the present disclosure, an association determination device is further provided. The device includes a first determining module.

The first determining module is configured to determine a correspondence between P control channel resources and Q sets of configuration information of one transmission parameter set.

P is a positive integer greater than or equal to 1, and Q is a positive integer less than or equal to P.

The above solution resolves the issue of the lack of relation between multiple control channel resources and multiple sets of transmission parameter configuration information in the related art. A correspondence between multiple control channel resources and multiple sets of transmission parameter configuration information is established, such that subsequent data transmission can be performed based on this correspondence.

It is to be added that both the terminal side and the base station side can execute the solution in step one described above. One transmission parameter set may be: the parameter set includes multiple parameters, and different sets of configuration information corresponding to multiple sets of control channel resources have different values of the multiple parameters.

Optionally, the correspondence between P control channel resources and Q sets of configuration information of the one transmission parameter set is determined, and the device is further configured to execute at least one of the following operations: first control signaling schedules a channel or a signal, where a transmission parameter of the first control signaling is determined according to a parameter of one control channel resource in the P control channel resources, and a transmission parameter set of the channel or the signal is determined according to one set of configuration information in the Q sets of configuration information which has a correspondence with the one control channel resource; or the one transmission parameter set is a transmission parameter set corresponding to a channel or a signal, where control signaling for scheduling the channel or the signal is included in a control channel included in P2 control channel resources or is included in a channel scheduled by a control channel included in the P2 control channel resources, where the P2 control channel resources belong to the P control channel resources.

Optionally, the operation that a correspondence between P control channel resources and/or Q sets of configuration information of the one transmission parameter set satisfy at least one of the following characteristics.

The P control channel resources belong to the same frequency domain bandwidth.

Q channels or Q signals corresponding to the Q sets of configuration information of the one transmission parameter set belong to the same frequency domain bandwidth.

The P control channel resources are control channel resources that one first communication node needs to detect (it is to be added that the P control channel resources are for one terminal).

The P control channel resources and Q channels or Q signals corresponding to the Q sets of configuration information belong to the same frequency domain bandwidth.

A first communication node is capable of simultaneously receiving Q types of channels and/or signals corresponding to the Q sets of configuration information, where the first communication node is a node that receives control channel resources.

A first communication node is capable of receiving the P control channel resources simultaneously, where the first communication node is a node that receives control channel resources.

A first communication node is not capable of simultaneously receiving different control channel resources in P1 control channel resources, where the P1 control channel resources belong to the P control channel resources and correspond to the same set of configuration information of the one transmission parameter set, and the first communication node is a node that receives control channel resources.

A first communication node is not capable of simultaneously receiving multiple control channel resources corresponding to the same set of configuration information of the one transmission parameter set, where the first communication node is a node that receives control channel resources.

In the above characteristics, the one transmission parameter set is about transmission parameters of the channels or signals.

Optionally, the operation that a correspondence between P control channel resources and Q sets of configuration information of one transmission parameter set is determined includes at least one of the following.

In configuration information of one control channel resource, Q1 sets of configuration information of the one transmission parameter set corresponding to the one control channel resource are configured.

P1 control channel resources corresponding to one set of configuration information of the one transmission parameter set are included in the one set of configuration information of the one transmission parameter set.

A correspondence between one control channel resource and Q1 sets of configuration information of one transmission parameter set corresponding to a channel or a signal is determined, where a control signaling for scheduling the channel or the signal is included in a control channel included in the control channel resource, or is included in a channel scheduled by a control channel included in the control channel resource.

A correspondence between one control channel resource group and Q2 sets of configuration information of one transmission parameter set corresponding to a channel or a signal is determined, where a control signaling for scheduling the channel or the signal is included in a control channel included in the control channel resource group, or is included in a channel scheduled by a control channel included in the control channel resource group.

The one transmission parameter set is a transmission parameter set corresponding to a channel or a signal, where control signaling for scheduling the channel or the signal is included in a control channel included in one control channel resource, or is included in a channel scheduled by a control channel included in one control channel resource.

The one transmission parameter set is a transmission parameter set corresponding to a channel or a signal, where a control signaling for scheduling the channel or the signal is included in a control channel included in a control channel resource group, or is included in a channel scheduled by a control channel included in the control channel resource group.

Q3 sets of configuration information of one transmission parameter set corresponding to a channel and/or signal in each frequency domain bandwidth of X frequency domain bandwidths are determined, and a correspondence between one control channel resource and the Q3 sets of configuration information is determined, where X is a positive integer greater than or equal to 1, and control information included in the control channel resource is used for scheduling channels or signals in the X frequency domain bandwidths.

In the above, Q1 and Q2 are integers less than or equal to Q, P1 is an integer less than or equal to P, and the one frequency domain bandwidth is one CC or one BWP.

Optionally, the correspondence between P control channel resources and Q sets of configuration information of one transmission parameter set is indicated through one of the following manners:
- the configuration information index information of the Q sets of configuration information being included in the configuration information of the control channel resource (that is, the configuration information index information of the Q sets of configuration information being included in the control channel resource configuration information); or
- control channel resource index information of the P control channel resources being included in Q sets of configuration information of the one transmission parameter set.

Optionally, the correspondence between P control channel resources and Q sets of configuration information of the one transmission parameter set is determined, and the device is further configured to execute at least one of the following operations:
- the number of bits of a first control signaling is determined according to one set of configuration information in the Q set of configuration information;
- the number of bits of a predetermined bit field of a first control signaling is determined according to one set of configuration information in the Q sets of configuration information; or the number of bits of a bit field of a first control signaling for notifying a transmission parameter of the transmission parameter set is determined according to one set of configuration information in the Q sets of configuration information.

In the above, a transmission parameter of a control channel in which the first control signaling is located is obtained according to a transmission parameter of one control channel resource in the P control channel resources, and the one set of configuration information corresponds to the one control channel resource.

(It is to be noted that a first control channel resource in the optional embodiment may be any one set or one specified set of control channel resources in the P control channel resources, but is not intended to limit the sequence of the P control channel resources, and N-th information and an N-th resource in the present application are also not intended to limit the sequence).

Optionally, the one transmission parameter set include at least one of the following parameter information: process number set information, BWP set information, uplink control channel resource set information, demodulation reference signal port set information, demodulation reference signal information, quasi co-located reference signal set information, TCI state pool indication information, downlink data channel indication information, uplink data channel indication information, uplink control channel indication information, PRB bundling size indication information, rate mating indication information, carrier indicator indication information, measurement reference signal information, a generation parameter of a scrambling sequence, TA information, control channel port information, a time domain resource allocation parameter, a frequency domain resource allocation parameter, or aperiodic measurement reference signal information; where one TCI state includes configuration information of one or more QCL reference signal sets.

Optionally, the control channel resources are physical layer control channel resources; and/or configuration information of the one transmission parameter set is included in a high-layer signaling.

Optionally, the correspondence between P control channel resources and Q sets of configuration information of one transmission parameter set is determined, and the device is further configured to execute at least one of the following operation:
- a second transmission parameter of a channel or a signal is obtained according to one set of configuration information of the one transmission parameter set, where the channel or the signal has a correspondence with one control channel resource in the P control channel resources, the one set of configuration information has a correspondence with the one control channel resource, and the second transmission parameter belongs to or does not belong to the one transmission parameter set.

Optionally, the operation that a correspondence between P control channel resources and Q sets of configuration information of one transmission parameter set is determined includes that one control channel resource corresponds to Q1 sets of configuration information of the one transmission parameter set, where Q1 is an integer greater than or equal to 1.

Optionally, when Q1 is greater than 1, the following information is indicated through a control signaling transmitted in the one control channel resource: determining a transmission parameter of a channel or a signal scheduled by the control signaling according to one specified set of configuration information in the Q1 sets of configuration information. (It is to be noted that the first set of configuration information in the optional embodiment may be any one set or one specified set of configuration information in Q sets of configuration information, but is not intended to limit the sequence of Q sets of configuration information.)

Optionally, the P control channel resources include one of the following characteristics:
- one control channel resource is one PDCCH control channel resource;
- one control channel resource is one CORESET resource;
- one control channel resource is one search space set resource;
- one control channel resource is one search space resource of an aggregation level;
- one control channel resource is one candidate PDCCH resource; or
- a generation parameter of a scrambling sequence of one control channel.

According to another embodiment of the present disclosure, a TA information determination device is further provided. The device includes a second determining module.

The second determining module is configured to determine TA information according to a first channel and/or a second signal, where the first signal is a signal transmitted by a first communication node, and the second signal is a signal received by the first communication node; and transmit a third signal according to the TA information.

It is to be noted that the first signal may be a beam signal transmitted by a terminal.

The above solution resolves the issue of the lack of a solution for determining a TA value in the related art, thereby realizing the accurate determination of the TA value for transmitting a third signal based on a first signal and/or second signal.

Optionally, the second channel or the second signal being a channel or signal received by the first communication node further satisfies at least one of following characteristics:

the second channel is a control channel, and the control channel includes a control signaling scheduling the third channel or the third signal;

the second signal and a demodulation reference signal of a control signaling scheduling the third channel or the third signal satisfy a QCL relationship at least with respect to one QCL parameter; or a spatial filtering parameter of the third channel or the third signal is obtained according to a spatial filtering parameter of the second signal.

Optionally, the second signal and a demodulation reference signal of a control signaling scheduling the third channel or the third signal satisfying a QCL relationship at least with respect to one QCL parameter includes: the second signal and the demodulation reference signal of the control signaling scheduling the third channel or the third signal satisfying the QCL relationship with respect to delay spread and/or average delay.

It is to be added that the second signal and the demodulation reference signal satisfy the QCL relationship at least with respect to a multi-path TA and/or an average TA.

Optionally, the control signaling scheduling the first channel and the control signaling scheduling the third channel or the third signal belong to the same control channel resource.

Optionally, the first communication node obtains at least one of the following information of the third channel or the third signal according to the first signal: spatial filtering parameter information of the third channel or the third signal, or power parameter information of the third channel or the third signal.

Optionally, the TA information is a time difference between a start position of a first time unit and a start position of a second time unit, where the third channel or the third signal corresponds to the first time unit, and the second channel or the third signal corresponds to the second time unit. It is to be added that the first time unit may be an uplink time unit, and the second time unit may be a downlink time unit.

Optionally, the device is further configured to execute at least one of the following operations:

the first channel or the second channel or the third channel includes at least one of the following channels: a data channel, or a control channel;

the first signal or the third signal includes at least one of the following signals: a demodulation reference signal, a measurement reference signal, or a random access signal;

the second signal includes at least one of the following signals: a demodulation reference signal, a measurement reference signal, a synchronization signal, or a measurement reference signal of a TRS.

Optionally, an association relationship between the first channel or the first signal and the TA information is established; an association relationship between the second channel or the second signal and the TA information is established; or an association relationship between a combination of the first channel or the first signal and the second channel or the second signal and the TA information is established.

It is to be added that establishing the association relationship between the signal and the TA information includes at least one of the following: including information of the signal in configuration information of the TA information, including the TA information in configuration information of the signal, or determining the TA information according to the information of the signal.

Optionally, the operation that the first communication node determines the TA information according to the second channel or the second signal includes: determining the TA information according to scrambling code information corresponding to the second channel or the second signal; determining the TA information according to a transmission parameter of a control channel resource in which the second channel or the second signal is located; or obtaining the TA information according to TA information included in configuration information of the second channel.

According to another embodiment of the present disclosure, a TA information determination device is further provided. The device includes a second transmitting module.

The second transmitting module is configured to transmit signaling information to a first communication node, where the signaling information includes at least one of following association relationships:

an association relationship between a first signal and TA information;

an association relationship between a second signal and TA information; or an association relationship between a combination of the first signal and the second first signal and TA information.

In the above, the first signal is a signal transmitted by the first communication node, and the second signal is a signal received by the first communication node.

It is to be added that establishing the association relationship between the first signal and the TA information includes at least one of the following: including information of the first signal in configuration information of the TA information; including the TA information in configuration information of the first signal; or determining the TA information according to the information of the first signal. Other association relationships works in a similar way.

The above solution resolves the issue of the lack of a solution for determining a TA value for the terminal to transmit the signal in a multi-TRP transmission scenario in the related art, such that the TA value can be determined based on the association relationship subsequently.

Optionally, the TA information is the basis for the first communication node to transmit the third channel or the third signal, or the TA information is the basis for the first communication node to transmit the first channel or the second signal.

Optionally, the device is further configured to execute the following operations: the first channel or the second channel or the third channel includes at least one of the following channels: a data channel, or a control channel; the first signal and the third signal includes at least one of the following signals: a demodulation reference signal, a measurement reference signal, or a random access signal; and the second signal includes at least one of the following signals: a demodulation reference signal, a measurement reference signal, a synchronization signal, or a measurement reference signal as a TRS.

Optionally, the signaling information includes one of the following signaling information: the signaling information as high-layer signaling information, or the signaling information as physical layer signaling information.

According to another embodiment of the present disclosure, a TA information determination device is further provided. The device includes a first receiving module and a third transmitting module.

The first receiving module is configured to receive configuration information of a third signal transmitted by a second communication node, where the configuration information includes TA information.

The third transmitting module is configured to transmit the third signal according to the TA information.

The above solution resolves the issue that the terminal cannot determine the TA value for transmitting an uplink signal in a multi-TRP transmission scenario in the related art, and provides a solution that the terminal determines the TA value according to configuration information.

Optionally, the operation of receiving the configuration information of the third signal includes at least one of the following: receiving high-layer configuration information of the third signal, and determining the high-layer configuration information of the third signal as the configuration information of the third signal; or receiving physical layer control signaling for scheduling the third signal, where the physical layer control signaling includes the configuration information of the third signal.

Optionally, in the configuration information of the third signal, the TA information is jointly encoded with at least one of the following information: a spatial filtering parameter of the third signal, or a power parameter of the third signal.

It is to be noted that the preceding modules may be implemented by software or hardware. Implementation by hardware may, but not necessarily, be performed in the following manner: the preceding modules are located in the same processor or the preceding modules, in any combination, are located in different processors.

Embodiment Three

According to an embodiment of the present disclosure, a storage medium is provided. The storage medium is configured to store a computer program, where the computer program, when executed, executes the method described in any embodiment described above.

Embodiment Four

According to another embodiment of the present disclosure, an electronic device is further provided. The electronic device includes a memory and a processor. The memory is configured to store a computer program, and the processor is configured to run the computer program for executing the method described in any embodiment described above.

An embodiment of the present disclosure further provides an electronic device that includes a memory and a processor. The memory stores a computer program and the processor is configured to execute the computer program to perform the steps in any one of the preceding method embodiments.

Apparently, it is to be understood by those skilled in the art that the modules or steps of the present disclosure may be implemented by at least one generic computing device and may be concentrated on a single computing device or distributed in a network formed by multiple computing devices.

Optionally, these modules or steps may be implemented by program codes executable by the at least one computing device. Thus, these modules or steps may be stored in a storage medium and executed by the at least one computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A correspondence determination method, comprising:
   determining Q control resource set (CORESET) groups, wherein the Q CORESET groups comprises P CORESETs, P is a positive integer greater than 1, Q is a positive integer less than or equal to P and Q is greater than 1; and
   determining a correspondence between the Q CORESET groups and Q sets of configuration information about one transmission parameter set, wherein, each of the Q CORESET groups corresponds to a respective one of the Q sets of configuration information about the one transmission parameter set, the P CORESETs belong to a same bandwidth part (BWP), Q channels or Q signals corresponding to the Q sets of configuration information belong to the same BWP, the one transmission parameter set comprises at least one transmission parameter of the Q channels or Q signals, wherein a parameter of a first control signaling which schedules one of the Q channels or Q signals is determined according to a parameter of one of the P CORESETs, and the one transmission parameter set of the one of the Q channels or Q signals is determined according to one of the Q sets of configuration information, wherein a CORESET comprising the first control signaling is in one of the Q CORESET groups and the one of the Q CORESET groups has a correspondence with the one of the Q sets of configuration information.

2. The correspondence determination method of claim 1, wherein the correspondence between the Q CORESET groups and the Q sets of configuration information about the one transmission parameter set is determined, and the method further comprises at least one of the following:
   a number of bits of the first control signaling is determined according to one set of configuration information in the Q sets of configuration information;
   a number of bits of a predetermined bit field of the first control signaling is determined according to one set of configuration information in the Q sets of configuration information; or
   a number of bits of a bit field of the first control signaling for notifying the transmission parameter of the one transmission parameter set is determined according to one set of configuration information in the Q sets of configuration information.

3. The correspondence determination method of claim 1, wherein the one transmission parameter set comprises at least one of following parameters:
   a transmission configuration indication (TCI) state pool parameter, a timing advance (TA) parameter, a rate matching indication parameter, a generation parameter of a scrambling sequence, or an uplink control channel resource set parameter; and
   wherein one TCI state pool comprises one or more quasi co-located (QCL) reference signal sets.

4. The correspondence determination method of claim 1, wherein
the Q sets of configuration information about the one transmission parameter set is comprised in a high-layer signaling.

5. The correspondence determination method of claim 1, wherein at least one of following characteristics is satisfied:
an intersection set between Q sets of physical uplink control channel (PUCCH) resource sets comprised in one BWP is null, wherein different sets of the Q sets of PUCCH resource sets correspond to different CORESET groups of the Q CORESET groups;
an intersection set between Q sets of measurement reference signal resources comprised in one BWP is null, wherein different sets of the Q sets of measurement reference signal resources correspond to different CORESET groups of the Q CORESET groups; or
an intersection set between Q sets of demodulation reference signal resources comprised in one BWP is null, wherein different sets of the Q sets of demodulation reference signal resources correspond to different CORESET groups of the Q CORESET groups.

6. The correspondence determination method of claim 1, further comprising:
receiving configuration information, wherein the configuration information comprises:
configuring M sets of physical uplink control channel configuration information (PUCCH-Configure) for one BWP;
wherein M is an integer greater than 1.

7. The correspondence determination method of claim 6, further comprising:
one set of data channel configuration information for one BWP comprises a plurality of sets of configuration information about the one transmission parameter set of the data channel, wherein the one transmission parameter set of the data channel comprises at least one of following parameters: a TCI state pool parameter, a rate matching indication parameter, a generation parameter of a scrambling sequence, a TA parameter.

8. The correspondence determination method of claim 6, further comprising:
receiving a second control signaling, wherein the second control signaling is used for configuring or scheduling an uplink control channel in the one BWP, and the second control signaling comprises index of one of the M sets of PUCCH-Configure comprised in the one BWP, wherein a transmission parameter of the uplink control channel is obtained according to PUCCH-Configure corresponding to the index;
wherein the second control signaling is a physical layer control signaling.

9. A correspondence determination device, comprising:
a processor; and
a memory, in which a computer program is stored;
wherein the processor is configured to execute the computer program to perform a method comprising the following:
determining Q control resource set (CORESET) groups, wherein the Q CORESET groups comprises P CORESETs, P is a positive integer greater than 1, Q is a positive integer less than or equal to P and Q is greater than 1;
determining a correspondence between the Q CORESET groups and Q sets of configuration information about one transmission parameter set, wherein each of the Q CORESET groups corresponds to a respective one of the Q sets of configuration information about the one transmission parameter set, the P CORESETs belong to a same bandwidth part (BWP), Q channels or Q signals corresponding to the Q sets of configuration information belong to the same BWP, the one transmission parameter set comprises at least one transmission parameter of the Q channels or Q signals, wherein a parameter of a first control signaling which schedules one of the Q channels or Q signals is determined according to a parameter of one of the P CORESETs, and the one transmission parameter set of the one of the Q channels or Q signals is determined according to one of the Q sets of configuration information, wherein a CORESET comprising the first control signaling is in one of the Q CORESET groups and the one of the Q CORESET groups has a correspondence with the one of the Q sets of configuration information.

10. The correspondence determination device of claim 9, wherein the one transmission parameter set comprises at least one of following parameters:
a transmission configuration indication (TCI) state pool parameter, a timing advance (TA) parameter, a rate matching indication parameter, a generation parameter of a scrambling sequence, an uplink control channel resource set parameter;
wherein one TCI state pool comprises one or more quasi co-located (QCL) reference signal sets.

11. The correspondence determination device of claim 9, wherein at least one of following characteristics is satisfied:
an intersection set between Q sets of physical uplink control channel (PUCCH) resource sets comprised in one BWP is null, wherein different sets of the Q sets of PUCCH resource sets correspond to different CORESET groups of the Q CORESET groups;
an intersection set between Q sets of measurement reference signal resources comprised in one BWP is null, wherein different sets of the Q sets of measurement reference signal resources correspond to different CORESET groups of the Q CORESET groups; or
an intersection set between Q sets of demodulation reference signal resources comprised in one BWP is null, wherein different sets of the Q sets of demodulation reference signal resources correspond to different CORESET groups of the Q CORESET groups.

12. The correspondence determination device of claim 9, wherein the correspondence between the Q CORESET groups and the Q sets of configuration information about the one transmission parameter set is determined, and the method further comprises at least one of the following:
a number of bits of the first control signaling is determined according to one set of configuration information in the Q sets of configuration information;
a number of bits of a predetermined bit field of the first control signaling is determined according to one set of configuration information in the Q sets of configuration information; or
a number of bits of a bit field of the first control signaling for notifying the transmission parameter of the one transmission parameter set is determined according to one set of configuration information in the Q sets of configuration information.

13. The correspondence determination device of claim 9, wherein
the Q sets of configuration information about the one transmission parameter set is comprised in a high-layer signaling.

14. The correspondence determination device of claim 9, wherein the method further comprises:
- receiving configuration information, wherein the configuration information comprises:
- configuring M sets of physical uplink control channel configuration information (PUCCH-Configure) for one BWP;
- wherein M is an integer greater than 1.

15. The correspondence determination device of claim 14, wherein the method further comprises:
- receiving a second control signaling, wherein the second control signaling is used for configuring or scheduling an uplink control channel in the one BWP, and the second control signaling comprises index of one of the M sets of PUCCH-Configure comprised in the one BWP, wherein a transmission parameter of the uplink control channel is obtained according to PUCCH-Configure corresponding to the index;
- wherein the second control signaling is a physical layer control signaling.

* * * * *